(12) United States Patent
Shigemori et al.

(10) Patent No.: US 8,344,047 B2
(45) Date of Patent: Jan. 1, 2013

(54) DISPERSING AGENT, AND PIGMENT COMPOSITION, PIGMENT-DISPERSED PRODUCT AND INKJET INK PREPARED THEREFROM

(75) Inventors: Kazunori Shigemori, Tokyo (JP); Tomoko Tachibana, Tokyo (JP); Yasushi Ariyoshi, Tokyo (JP); Ken Yamazaki, Tokyo (JP); Atsushi Yoda, Tokyo (JP); Daisuke Fujiwara, Tokyo (JP); Atsushi Nakazato, Tokyo (JP); Tsutomu Hiroshima, Tokyo (JP)

(73) Assignee: Toyo Ink Manufacturing Co., Ltd., Tokyo (JP)

( * ) Notice: Subject to any disclaimer, the term of this patent is extended or adjusted under 35 U.S.C. 154(b) by 281 days.

(21) Appl. No.: 12/934,083

(22) PCT Filed: Mar. 24, 2009

(86) PCT No.: PCT/JP2009/055753
§ 371 (c)(1),
(2), (4) Date: Sep. 23, 2010

(87) PCT Pub. No.: WO2009/119546
PCT Pub. Date: Oct. 1, 2009

(65) Prior Publication Data
US 2011/0021675 A1   Jan. 27, 2011

(30) Foreign Application Priority Data

Mar. 24, 2008  (JP) ................... 2008-075219
Mar. 24, 2008  (JP) ................... 2008-075220
Mar. 19, 2009  (JP) ................... 2009-067974

(51) Int. Cl.
*C09D 11/00* (2006.01)
(52) U.S. Cl. ............ 523/160; 523/161; 524/88; 524/90; 524/590; 528/65
(58) Field of Classification Search .................. 523/160
See application file for complete search history.

(56) References Cited

U.S. PATENT DOCUMENTS

| | | | |
|---|---|---|---|
| 4,818,804 A | 4/1989 | Kuriyama et al. | |
| 5,100,969 A | 3/1992 | Yamamoto et al. | |
| 5,187,229 A | 2/1993 | Yamamoto et al. | |
| 5,760,257 A | 6/1998 | Tanaka et al. | |
| 6,262,207 B1 | 7/2001 | Rao et al. | |
| 2007/0167538 A1 | 7/2007 | Mochizuki et al. | |
| 2008/0097005 A1 | 4/2008 | Shiotani | |
| 2008/0227945 A1* | 9/2008 | Richards et al. ............. | 528/75 |

FOREIGN PATENT DOCUMENTS

| | | |
|---|---|---|
| JP | 63-066211 | 3/1988 |
| JP | 01-236930 | 9/1989 |
| JP | 03-103478 | 4/1991 |
| JP | 05-194702 | 8/1993 |
| JP | 09-169821 | 6/1997 |
| JP | 09-194585 | 7/1997 |
| JP | 2004-089787 | 3/2004 |
| JP | 2004-339367 | 12/2004 |
| JP | 2004-344795 | 12/2004 |
| JP | 2006-056990 | 3/2006 |
| JP | 2007-131753 | 5/2007 |
| JP | 2007-169492 | 7/2007 |
| JP | 2007-284642 | 11/2007 |
| WO | 81/02546 | 9/1981 |
| WO | 00/37167 | 6/2000 |
| WO | 2006/132910 | 12/2006 |
| WO | 2009/119546 | 10/2009 |

OTHER PUBLICATIONS

International Search Report for PCT/JP2009/055753, dated Jun. 30, 2009.

* cited by examiner

*Primary Examiner* — Doris Lee
(74) *Attorney, Agent, or Firm* — Heslin Rothenberg Farley & Mesiti P.C.

(57) ABSTRACT

A dispersing agent characterized in that said dispersing agent is prepared by reacting primary and/or secondary amino groups of an amine compound comprising a polyamine (C) with isocyanate groups of a urethane prepolymer (E) having two isocyanate groups in one terminal region, wherein said urethane prepolymer (E) has been prepared by reacting hydroxyl groups in a vinyl polymer (A) having two hydroxyl groups in one terminal region with isocyanate groups in diisocyanates (B), and in that an amine number of said dispersing agent is 1 to 100 mgKOH/g is disclosed. The dispersing agent of the present invention has excellent dispersibility, flowability, and storage stability when used in small quantities. A pigment-dispersed product can be prepared therefrom, independently of the kinds of binder resin or solvent used. Further, the present invention is suitable for offset ink, gravure ink, resist ink for a color filter, inkjet ink, coating composition, and colored resin composition.

22 Claims, No Drawings

DISPERSING AGENT, AND PIGMENT COMPOSITION, PIGMENT-DISPERSED PRODUCT AND INKJET INK PREPARED THEREFROM

CROSS REFERENCE TO RELATED APPLICATIONS

This application is a national phase filing under 35 U.S.C. §371 of PCT International Application PCT/JP2009/055753, filed Mar. 24, 2009, and published under PCT Article 21(2) in Japanese as WO 2009/119546 on Oct. 1, 2009. PCT/JP2009/055753 claims priority from Japanese application No. 2008-075219 filed on Mar. 24, 2008, Japanese application No. 2008-075220 filed Mar. 24, 2008 and Japanese application No. 2009-067974 filed Mar. 19, 2009. The entire contents of each of the prior applications are incorporated herein by reference.

TECHNICAL FIELD

The present invention relates to a dispersing agent, more particularly, a dispersing agent capable producing a pigment-dispersed product which has excellent dispersibility, flowability, and storage stability and which is suitable for fields such as a coating composition and a colored resin composition. The present invention also relates to a pigment composition prepared therefrom.

Further, the object of the present invention is to provide an inkjet ink which comprises the dispersing agent and a colorant, and has excellent dispersibility, flowability, storage stability, printability, and print-fastness.

BACKGROUND ART

<Dispersing Agent>

It is known that, when producing an ink or the like, it is difficult to stably disperse high concentrations of pigments and many problems are caused in the manufacturing steps and products. For example, many products obtained by dispersing fine particles of pigments have a high viscosity and is difficult to remove them from a dispersing or transportation apparatus. When the dispersed product has an extremely high viscosity, it turns into a gel during storage and becomes difficult to use. Further, the glaze is lowered and undesirable conditions such as a bad leveling occur on the surface that the product is applied to. When a mixture of different pigments is used, a color separation by aggregation, a coloring unevenness or a considerable coloring reduction by sedimentation or the like may occur on the surface that the product is applied to.

Thus, a dispersing agent is generally used to consistently maintain a dispersed state. The dispersing agent has a structure containing a site for adsorbing a pigment and a site having a high affinity to the solvent which is the dispersion medium. Properties of the dispersing agent are dependent on a balance of the two functional sites. Various dispersing agents are used in accordance with surface conditions of the pigment to be dispersed. A basic dispersing agent is generally used for a pigment having an acidic surface. In this case, a basic functional group is the site for adsorbing the pigment. Dispersing agents having an amino group as the basic functional group are disclosed in, for example, Patent Documents 1 to 6.

The dispersing agents disclosed in Patent Documents 1 to 3 have dispersibility. However, the side chains thereof are limited, and thus, solvents or binder resins which may be used are limited. The dispersing agents disclosed in Patent Documents 4 to 6 have a certain degree of dispersibility. However, they have to be used in large amounts to obtain a stably dispersed product having a low viscosity. However, it is preferable not to use a large amount of the dispersing agent, in view of a possible reduction of a coating durability when applied to an ink, a coating composition, or the like.

Patent Documents 7 and 8 disclose a polyurethane resin characterized in that a polyol, prepared by polymerizing a compound having a polymerizable unsaturated bond with a mercaptan compound having two hydroxy groups as an initiator, is used. However, the polyurethane resin does not contain a residual amine as a basic site, and thus does not exhibit a sufficient dispersibility to a pigment having an acidic surface, when the polyurethane resin is used as a dispersing agent.

Further, Patent Document 9 discloses a polyurethane urea resin characterized in that a polyol, prepared by polymerizing a compound having a polymerizable unsaturated bond with a mercaptan compound having two hydroxy groups as an initiator, is used. However, the polyurethane urea resin is a particulate polyurethane, and thus does not exhibit a sufficient dispersibility to a pigment having an acidic surface, when the polyurethane urea resin is used as a dispersing agent.

<Inkjet Ink>

In the past, an ink prepared by dissolving a water-soluble dye, such as an acid dye, a direct dye, or a basic dye, in a glycolether-based solvent and water was widely used as an inkjet ink. Recently, however, an ink containing a pigment is prevailingly used as an ink in the field of advertising signs requiring durability. However, it is known that, when the ink is prepared, it is difficult to stably disperse pigments at high concentration, and many problems are caused in the manufacturing steps and products. For example, many dispersed products of fine particles of pigments have a high viscosity. In case of an extremely high viscosity, it may turn into a gel during storage and become difficult to use. A high stability is required for an inkjet ink, in particular, because the ink is discharged from a fine nozzle. Thus, a viscosity increase during storage may become a fatal defect because a nozzle may be clogged and inhibit discharging the ink.

Thus, a dispersing agent is generally used to consistently maintain a dispersed state. In particular, a dispersing agent having an amino group as a basic functional group is preferentially used, and is disclosed in, for example, Patent Documents 10 and 11.

However, the dispersing agents disclosed in Patent Documents 10 and 11 have a problem of a low coating durability, although they have a high dispersion stability. Further, when the dispersing agents disclosed in Patent Documents 10 to 12 are used, the binder resins which can be combined therewith are limited. Thus, these dispersing agents are not preferable because a coating durability, and/or a print stability may be lowered.

[patent reference 1] Japanese Unexamined Patent Publication (Kokai) No. 9-169821
[patent reference 2] Japanese Unexamined Patent Publication (Kokai) No. 9-194585
[patent reference 3] Japanese Unexamined Patent Publication (Kokai) No. 2004-089787
[patent reference 4] Japanese Unexamined Patent Publication (Kokai) No. 1-236930
[patent reference 5] Japanese Unexamined Patent Publication (Kokai) No. 3-103478
[patent reference 6] Japanese Unexamined Patent Publication (Kokai) No. 2004-344795

[patent reference 7] Japanese Translation Publication (Kohyo) No. 57-500246
[patent reference 8] Japanese Unexamined Patent Publication (Kokai) No. 63-066211
[patent reference 9] Japanese Unexamined Patent Publication (Kokai) No. 5-194702
[patent reference 10] Japanese Unexamined Patent Publication (Kokai) No. 2007-284642
[patent reference 11] Japanese Unexamined Patent Publication (Kokai) No. 2006-056990
[patent reference 12] Japanese Unexamined Patent Publication (Kokai) No. 2007-169492

DISCLOSURE OF THE INVENTION

Problems to be Solved by the Invention

The object of the present invention is to provide a dispersing agent for obtaining a pigment-dispersed product which has an excellent dispersibility, flowability, and storage stability when used in small quantities, without limiting which binder resins or solvents may be used. Further, the object of the present invention is to provide: a dispersing agent which is suitable for an offset ink, a gravure ink, a resist ink for a color filter, an inkjet ink, a coating composition, or a colored resin composition and which can impart a dispersibility, a dispersibility and a stability with an excellent flowability; a method for preparing the dispersing agent; a pigment composition, a pigment-dispersed product, and an inkjet ink prepared from the dispersing agent.

Means for Solving the Problems

The above problems can be solved by a dispersing agent characterized in that said dispersing agent is prepared by reacting primary and/or secondary amino groups of an amine compound comprising a polyamine (C) with isocyanate groups of a urethane prepolymer (E) having two isocyanate groups in one terminal region, wherein said urethane prepolymer (E) has been prepared by reacting hydroxyl groups in a vinyl polymer (A) having two hydroxyl groups in one terminal region with isocyanate groups in diisocyanates (B), and in that the amine number of said dispersing agent is 1 to 100 mgKOH/g.

Further, the present invention relates to the dispersing agent, characterized in that the amine compound comprises a monoamine (D) in addition to the polyamine (C).

Furthermore, the present invention relates to the dispersing agent, characterized in that the vinyl polymer (A) having two hydroxyl groups in one terminal region is prepared by radical polymerization of ethylenic unsaturated monomers (a2) in the presence of a compound (a1) having two hydroxyl groups and a thiol group in a molecule.

The present invention also relates to the dispersing agent, characterized in that the ethylenic unsaturated monomer (a2) comprises a lower alkyl(meth)acrylate.

Further, the present invention relates to the dispersing agent, characterized in that an amount of the lower alkyl (meth)acrylate is 30 to 100% by weight with respect to the total amount of the ethylenic unsaturated monomers (a2).

Further, the present invention relates to the dispersing agent, characterized in that a weight-average molecular weight of the vinyl polymer (A) having two hydroxyl groups in one terminal region is 500 to 30,000.

Further, the present invention relates to the dispersing agent, characterized in that the polyamine (C) is a compound having two primary and/or secondary amino groups.

Further, the present invention relates to the dispersing agent, characterized in that the polyamine (C) is a compound having two primary and/or secondary amino groups in each terminal region, and further having a secondary and/or tertiary amino group in a region other than the terminal regions.

Further, the present invention relates to the dispersing agent, characterized in that the weight-average molecular weight is 1,000 to 100,000.

Furthermore, the present invention relates to a method for preparing a dispersing agent, comprising: a first step wherein a vinyl polymer (A) having two hydroxyl groups in one terminal region is produced by radical polymerization of ethylenic unsaturated monomers (a2) in the presence of a compound (a1) having two hydroxyl groups and one thiol group in a molecule,
a second step wherein a urethane prepolymer (E) having two isocyanate groups in one terminal region is produced by reacting hydroxyl groups in the vinyl polymer (A) having two hydroxyl groups in one terminal region and isocyanate groups in diisocyanates (B), and
a third step wherein isocyanate groups in the urethane prepolymer (E) having two isocyanate groups in one terminal region are reacted with primary and/or secondary amino groups in an amine compound comprising at least a polyamine (C).

The present invention also relates to the method for preparing the dispersing agent, characterized in that the amine compound comprises a monoamine (D) in addition to the polyamine (C).

Further, the present invention relates to the method for preparing the dispersing agent, characterized in that the first step, the second step, and/or the third step are carried out in a solvent, and said solvent is a diethylene glycol di-loweralkyl ether.

Further, the present invention relates to a pigment composition comprising the dispersing agent and a pigment.

Further, the present invention relates to the pigment composition, characterized by further comprising at least one pigment derivative selected from the group consisting of pigment derivatives having an acidic substituent, of the following general formulas (1) to (3):
the general formula (1):

wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, and $Z^1$ is a sulfonic group, or a carboxyl group;
the general formula (2):

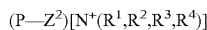

wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, $R^1$ is an alkyl group having 5 to 20 carbon atoms, $R^2$, $R^3$, and $R^4$ are, independently, a hydrogen atom or an alkyl group having 1 to 20 carbon atoms, and $Z^2$ is $SO_3^-$ or $COO^-$; and the general formula (3):

$(P-Z^2)M^+$ wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, M is an Na atom or a K atom, and $Z^2$ is $SO_3^-$ or $COO^-$.

Further, the present invention relates to a pigment-dispersed product prepared by dispersing the pigment composition in a solvent or a varnish.

Further, the present invention relates to the inkjet ink comprising pigment-dispersed product and a binder resin.

Further, the present invention relates to the inkjet ink, characterized in that the binder resin is prepared by radical polymerization of ethylenic unsaturated monomers (a3).

Further, the present invention relates to the inkjet ink, characterized in that the ethylenic unsaturated monomers (a3) comprise methyl methacrylate.

Further, the present invention relates to the inkjet ink, characterized in that the ethylenic unsaturated monomers (a3) further comprise butyl methacrylate.

Further, the present invention relates to the inkjet ink, characterized in that a sum of the amounts of methyl methacrylate and butyl methacrylate is 30 to 100% by weight with respect to the total amount of the ethylenic unsaturated monomers (a3).

Further, the present invention relates to the inkjet ink, characterized in that the amount of monomers of the following general formula (4) is 5 to 100% by weight with respect to the total amount of the ethylenic unsaturated monomers (a3):
the general formula (4):

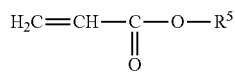

wherein $R^5$ is a linear or branched alkyl group having 1 to 4 carbon atoms, or a cycloaliphatic alkyl group having 6 to 15 carbon atoms.

Further, the present invention relates to the inkjet ink, further comprising diethyleneglycol diethyl ether as a solvent.

Effects of the Invention

The dispersing agent of the present invention can be used to produce a pigment composition having a dispersibility, a flowability, and a storage stability which have not been obtained in prior art. Further, the dispersing agent of the present invention can stably disperse a pigment or a pigment composition in a solvent or a varnish for a long period without aggregating pigment particles, and thus can provide a pigment-dispersed product which has a high dispersibility and a high storage stability and which is suitable for an offset ink, a gravure ink, a resist ink for a color filter, an inkjet ink, a coating composition, or a colored resin composition. In particular, an inkjet ink having an excellent dispersibility, an excellent flowability, a high stability with time, an excellent printability, and an excellent coating durability can be provided for inkjet printing.

BEST MODE FOR CARRYING OUT THE INVENTION

Each of the terms "(meth)acryloyl", "(meth)acryl", "(meth)acrylic acid", "(meth)acrylate", "(meth)acryloyloxy", or "(meth)acrylamide" as used herein refers to "acryloyl and/or methacryloyl", "acryl and/or methacryl", "acrylic acid and/or methacrylic acid", "acrylate and/or methacrylate", "acryloyloxy and/or methacryloyloxy", or "acrylamide and/or methacrylamide", respectively, unless otherwise specified.

{Dispersing Agent}

A dispersing agent has a structure containing a site for adsorbing a pigment and a site having a high affinity to a solvent which is a dispersion medium. Properties of the dispersing agent are dependent on a balance of the two functional sites. That is to say, a property to adsorb a pigment and an affinity to the solvent as a dispersion medium are very important for a dispersing agent to develop a good dispersibility.

The object of the present invention is to provide a novel dispersing agent which can disperse a pigment having an acidic surface without limiting the pigment carrier such as a binder resin or the dispersion medium such as an organic solvent to obtain a pigment-dispersed product having an excellent flowability and an excellent storage stability.

Further, the most important characteristic feature of an inkjet ink of the present invention resides in that the following dispersing agent is contained.

The dispersing agent of the present invention is prepared by reacting primary and/or secondary amino groups of an amine compound comprising a polyamine (C) and optionally a monoamine (D), and isocyanate groups of a urethane prepolymer (E) having two isocyanate groups in one terminal region, wherein the urethane prepolymer (E) has been prepared by reacting hydroxyl groups in a vinyl polymer (A) having two hydroxyl groups in one terminal region with isocyanate groups in diisocyanates (B).

In the molecule of the dispersing agent according to the present invention, the vinyl polymer sites which are derived from the vinyl polymer (A) and grafted as side chains on the backbone chain have an excellent affinity to various pigment carriers and dispersion media, and thus serve as solvent-affinity sites. On the other hand, the urea bonding sites in the backbone chain of the molecule of the dispersing agent according to the present invention serve as adsorbing groups for acidic surfaces of pigments. Further, amino groups can be introduced into the backbone to enhance the adsorbability.

Constitutional elements in the dispersing agent of the present invention will be described hereinafter.

<Vinyl Polymer (A) Having Two Hydroxyl Groups in One Terminal Region>

The vinyl polymer (A) having two hydroxyl groups in one terminal region [sometimes hereinafter simply referred to as the vinyl polymer (A)] can be prepared by radical polymerization of ethylenic unsaturated monomers (a2) in the presence of a compound (a1) having two hydroxyl groups and a thiol group in a molecule. The vinyl polymer site in the vinyl polymer (A) corresponds to a site having high affinity to a pigment carrier such as a binder resin and a solvent as a dispersion medium, and the vinyl polymer (A) has a structure of the following general formula (5).

the general formula (5):

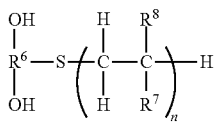

In the general formula (5), $R^6$ is a residue of the compound (a1) from which hydroxyl groups and a thiol group have been removed, $R^7$ is a residue of the ethylenic unsaturated monomer (a2) from which double-bond sites and $R^8$ have been removed, and $R^8$ is a hydrogen atom or a methyl group, n is an integer of 2 or more, preferably an integer of between 3 and 200, and $R^6$ corresponds to the terminal region of the vinyl polymer (A).

<Compound (a1) having Two Hydroxyl groups and a Thiol Group in a Molecule>

The compound (a1) [sometimes hereinafter simply referred to as the compound (a1)] having two hydroxyl groups and a thiol group in a molecule is not limited as long as it has two hydroxyl groups and a thiol group in a molecule. There may be mentioned as examples, 1-mercapto-1,1-methanediol, 1-mercapto-1,1-ethanediol, 3-mercapto-1,2-propanediol (also referred to as thioglycerin or thioglycerol), 2-mercapto-1,2-propanediol, 2-mercapto-2-methyl-1,3-propanediol, 2-mercapto-2-ethyl-1,3-propanediol, 1-mercapto-2,2-propanediol, 2-mercaptoethyl-2-methyl-1,3-propanediol, or 2-mercaptoethyl-2-ethyl-1,3-propanediol.

The residue $R^6$ in the general formula (5), that is the residue of the compound (a1) from which hydroxyl groups and a thiol group have been removed, is not limited. In view of the compatibility with solvents, varnishes, or binder resins, however, the residue $R^6$ is preferably a linear or branched alkyl group having 1 to 20 carbon atoms, more preferably a linear or branched alkyl group having 1 to 7 carbon atoms, such as the residue of the compounds (a1) mentioned above. Two hydroxyl groups and a thiol group may bind to different carbon atoms, respectively, or the same carbon atom, or a part of two hydroxyl groups and a thiol group may bind to the same carbon atom.

In accordance with the desired molecular weight of the vinyl polymer (A) having two hydroxyl groups in one terminal region, the vinyl polymer (A) can be prepared by mixing and heating the compound (a1), the ethylenic unsaturated monomer (a2) and optionally a polymerization initiator. It is preferable to use 0.5 to 30 parts by weight of the compound (a1) with respect to 100 parts by weight of the ethylenic unsaturated monomer (a2) in a mass polymerization or a solution polymerization. The amount of the compound (a1) is more preferably 1 to 20 parts by weight, still more preferably 2 to 15 parts by weight, and particularly preferably 2 to 10 parts by weight. The reaction temperature is 40 to 150° C., preferably 50 to 110° C. If the amount of the compound (a1) used is less than 0.5 part by weight, the molecular weight of the vinyl polymer sites becomes too large, and an absolute amount of the affinity sites for the pigment carriers and the solvents is increased. Thus, the dispersibility may be lowered. If the amount of the compound (a1) used is more than 30 parts by weight the molecular weight of the vinyl polymer (A) sites becomes too small, and the steric repulsion effects thereof may be lost as the affinity sites for the pigment carriers and the solvents and the inhibition of the aggregation of the pigments may be difficult.

<Polymerization Initiator>

Upon polymerizing, 0.001 to 5 parts by weight of a polymerization initiator may be optionally used for each 100 parts by weight of the ethylenic unsaturated monomer (a2). As the polymerization initiator, an azo-based compound or an organic peroxide may be used.

The azo-based compound may be, for example, 2,2'-azobis(isobutyronitrile), 2,2'-azobis(2-methylbutyronitrile), 1,1'-azobis(cyclohexane 1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyano valeric acid), 2,2'-azobis(2-hydroxymethylpropionitrile), or 2,2'-azobis[2-(2-imidazoline-2-yl)propane].

The organic peroxide may be, for example, benzoyl peroxide, t-butyl perbenzoate, cumene hydroperoxide, diisopropyl peroxydicarbonate, di-n-propyl peroxydicarbonate, di(2-ethoxydiethyl)peroxydicarbonate, t-butylperoxyneodecanoate, t-butylperoxyvalerate, (3,5,5-trimethylhexanoyl)peroxide, dipropionyl peroxide, or diacetyl peroxide.

The polymerization initiators above may be used alone, or in combination thereof <Polymerization Solvent>

In the solution polymerization, a polymerization solvent, such as ethyl acetate, n-butyl acetate, isobutyl acetate, toluene, xylene, acetone, hexane, methyl ethyl ketone, cyclohexanone, or diethylene glycol di-lower alkyl ether may be used. A preferable solvent in view of the dispersion stability is, but not limited to, a diethylene glycol lower alkyl ether, and among them, a preferable solvent in view of a low odor is, but not limited to, diethyleneglycol diethyl ether.

The polymerization solvent as above may be used in combination thereof. A preferable solvent is one also used in the final application.

<Ethylenic Unsaturated Monomer (a2)>

The ethylenic unsaturated monomer (a2) is, for example, methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, 2-ethylhexyl (meth)acrylate, cyclohexyl(meth)acrylate, stearyl(meth)acrylate, lauryl(meth)acrylate, trimethylcyclohexyl(meth)acrylate, isobornyl(meth)acrylate, or other alkyl(meth)acrylates;

phenyl(meth)acrylate, benzyl(meth)acrylate, phenoxyethyl (meth)acrylate, phenoxydiethylene glycol (meth)acrylate, or other aromatic (meth)acrylates; tetrahydrofurfuryl(meth) acrylate, oxetane (meth)acrylate, or other heterocyclic (meth) acrylates;

methoxy polypropylene glycol (meth)acrylate, ethoxy polypropylene glycol (meth)acrylate, or other alkoxy polyalkylene glycol (meth)acrylates;

(meth)acrylamide, N,N-dimethyl(meth)acrylamide, N,N-diethyl(meth)acrylamide, N-isopropyl (meth)acrylamide, diacetone (meth)acrylamide, acryloylmorpholine, or other N-substituted (meth)acrylamides;

N,N-dimethylaminoethyl(meth)acrylate, N,N-diethylaminoethyl(meth)acrylate, or other carboxyl-group-containing (meth)acrylates; or (meth)acrylonitrile, or other nitriles.

Further, monomers which can be used in combination with the above acrylic monomer are, for example, styrene, α-methylstyrene, or other styrenes;

ethyl vinyl ether, n-propyl vinyl ether, isopropylvinylether, n-butyl vinyl ether, isobutyl vinyl ether, or other vinyl ethers; or, vinyl acetate, vinyl propionate, or other fatty vinyls.

A carboxyl-group-containing ethylenic unsaturated monomer may be used in combination with the above acrylic monomer. The carboxyl-group-containing ethylenic unsaturated monomer may be one or more selected from acrylic acid, methacrylic acid, itaconic acid, maleic acid, fumaric acid, or crotonic acid.

<Polymerization Conditions or the Like>

Among the ethylenic unsaturated monomers (a2) mentioned above, it is preferable in the present invention to use a lower alkyl(meth)acrylate wherein a lower alkyl moiety has 1 to 4 carbon atoms, particularly methyl methacrylate, in view of the dispersibility and the coating durability, and more preferable to use a combination of methyl methacrylate and n-butyl methacrylate or t-butyl methacrylate in view of the affinity to the pigment carriers and dispersion media. When n-butyl methacrylate or t-butyl methacrylate is not used as the ethylenic unsaturated monomer (a2), methyl methacrylate is used in an amount of, preferably 30 to 100% by weight, and more preferably 50 to 100% by weight with respect to the total amount of the ethylenic unsaturated monomer (a2). When a combination of methyl methacrylate and n-butyl methacrylate or t-butyl methacrylate is used as the ethylenic unsaturated monomer (a2), the total amount thereof is preferably 30 to 100% by weight or more preferably 50 to 100% by weight with respect to the amount of the ethylenic unsaturated monomer (a2). When methyl methacrylate or the combination of methyl methacrylate and n-butyl methacrylate or t-butyl methacrylate is used as the ethylenic unsaturated monomer (a2), the dispersibility of the pigment is enhanced. The copolymerized site of methyl methacrylate and n-butyl methacrylate or t-butyl methacrylate has fundamental properties, such as dispersibility, and affinities to binder resins or dispersing solvents, and thus may be used for general purposes.

The weight-average molecular weight (Mw) of the vinyl polymer (A) having two hydroxyl groups in one terminal region as a converted value of the corresponding polystyrene by means of GPC (gel permeation chromatography) is preferably 500 to 30,000, more preferably 1,000 to 15,000 and particularly preferably 1,000 to 8,000. If the weight-average molecular weight is less than 500, the steric repulsion effect obtained from the sites affinity to the solvents may be lowered, the aggregation of pigments may become difficult, and the dispersion stability may be insufficient. If the weight-average molecular weight is more than 30,000, the absolute amount of the sites affinity to the solvents may be increased, and thus, the dispersibility may be lowered and the viscosity of the dispersed product may be increased.

When the weight-average molecular weight is 500 to 30,000, the aggregation of pigments can be inhibited, and the increase of the viscosity of the pigment-dispersed product can be inhibited.

The glass transition temperature (Tg) of the vinyl polymer (A) having two hydroxyl groups in one terminal region is preferably 50 to 200° C. and more preferably 50 to 120° C., because the coating durability is enhanced.

The glass transition temperature (Tg) of the vinyl polymer (A) having two hydroxyl groups in one terminal region is determined by the following Fox formula. Although the molecule of the vinyl polymer (A) contains the skeleton derived from the compound (a1) having two hydroxyl groups and a thiol group, the skeleton is excluded in the following calculation to determine the glass transition temperature.

$$1/Tg = W1/Tg1 + W2/Tg2 + \ldots + Wn/Tgn$$

Each of W1 to Wn means a weight fraction of each monomer used, and each of Tg1 to Tgn means a glass transition temperature (unit: absolute temperature "K") of homopolymer prepared from each monomer used.

The glass transition temperatures of typical homopolymers used for the calculation are as follows:
methyl methacrylate: 105° C. (378K)
n-butyl methacrylate: 20° C. (293K)
t-butyl methacrylate: 107° C. (380K)
lauryl methacrylate: −65° C. (208K)
2-ethylhexyl methacrylate: −10° C. (263K)
cyclohexyl methacrylate: 66° C. (339K)
n-butyl acrylate: −45° C. (228K)
ethyl acrylate: −20° C. (253K)
benzyl methacrylate: 54° C. (327K) styrene: 100° C. (373K).

<Diisocyanate (B)>

The diisocyanate (B) which may be used in the present invention may be a known compound conventionally used in the synthesis of polyurethane or the like, for example, diisocyanate (b1) having an aromatic group, diisocyanate (b2) having an aliphatic group, diisocyanate (b3) having an aromatic group and an aliphatic group, or diisocyanate (b4) having a cycloaliphatic group.

The diisocyanate (b1) having an aromatic group is, for example, xylylene diisocyanate, 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, naphthylene diisocyanate, or 1,3-bis(isocyanate methyl)benzene.

The diisocyanate (b2) having an aliphatic group is, for example, trimethylene diisocyanate, tetramethylene diisocyanate, hexamethylene diisocyanate (HDI), pentamethylene diisocyanate, 1,2-propylene diisocyanate, 2,3-butylene diisocyanate, 1,3-butylene diisocyanate, dodecamethylene diisocyanate, or 2,4,4-trimethylhexamethylene diisocyanate.

The diisocyanate (b3) having an aromatic group and an aliphatic group is, for example, ω,ω'-diisocyanate-1,3-dimethylbenzene, ω,ω'-diisocyanate-1,4-dimethylbenzene, ω,ω'-diisocyanate-1,4-diethylbenzene, 1,4-tetramethylxylylene diisocyanate, or 1,3-tetramethylxylylene diisocyanate.

The diisocyanate (b4) having cycloaliphatic group is, for example, 3-isocyanatemethyl-3,5,5-trimethylcyclohexylisocyanate (IPDI), 1,3-cyclopentane diisocyanate, 1,3-cyclohexane diisocyanate, 1,4-cyclohexane diisocyanate, methyl-2,4-cyclohexane diisocyanate, or methyl-2,6-cyclohexane diisocyanate, 4,4'-methylenebis.

The diisocyanate (B) is not limited to the above-mentioned compounds, and the above-mentioned compounds may be used in combination thereof.

It is preferable to use 3-isocyanatemethyl-3,5,5-trimethylcyclohexylisocyanate [isophorone diisocyanate, IPDI] as the diisocyanate (B), in view of the property that the product containing the same does not turn yellow easily.

<Polyamine (C)>

The polyamine (C) which may be used in the present invention is a compound having at least two primary and/or secondary amino groups, and is used to form urea bondings by reaction with isocyanate groups. The amine may be the diamine (c1).

The diamine (c1) having two primary amino groups may be a known compound conventionally used as a chain extender in the synthesis of polyurethane or the like, for example, an aliphatic diamine, such as ethylenediamine, propylene diamine [also referred to as 1,2-diaminopropane or 1,2-propanediamine], trimethylenediamine [also referred to as 1,3-diaminopropan or 1,3-propanediamine], tetramethylenediamine [also referred to as 1,4-diaminobutane], 2-methyl-1,3-propanediamine, pentamethylenediamine [also referred to as 1,5-diaminopentane], hexamethylene diamine [also referred to as 1,6-diaminohexane], 2,2-dimethyl-1,3-propanediamine, 2,2,4-trimethylhexamethylenediamine, or tolylenediamine; an alicyclic diamine, such as isophorone diamine, or dicyclohexylmethane-4,4'-diamine; or an aromatic diamine, such as phenylenediamine, or xylylenediamine.

The diamine (c1) having two secondary amino groups may be a known compound conventionally used as a chain extender in the synthesis of polyurethane or the like, for example, N,N-dimethylethylenediamine, N,N-diethylethylene-diamine, or N,N'-di-tert-butylethylenediamine.

Further, the diamine (c1) having primary and secondary amino groups may be a known compound conventionally used as a chain extender in the synthesis of polyurethane or the like, for example, N-methylethylenediamine [methylamino-ethylamine], N-ethylethylenediamine [ethylaminoethylamine], N-methyl-1,3-propanediamine [N-methyl-1,3-diaminopropane or methylaminopropylamine], N-2-methyl-1,3-propanediamine, N-isopropylethylenediamine [isopropylaminoethylamine], N-isopropyl-1,3-diaminopropane [N-isopropyl-1,3-propanediamine or isopropylaminopropylamine], or N-lauryl-1,3-propanediamine [N-lauryl-1,3-diaminopropane or laurylaminopropylamine].

The polyamine used in the present invention is a compound having at least two primary and/or secondary amino groups, and forms urea groups by the reaction of the primary and/or secondary amines with isocyanate groups. The urea groups become the pigment-adsorbing sites. It is particularly desirable that the polyamine (C) has two primary and/or secondary amino groups in each terminal region, and further has a secondary and/or tertiary amino group in a region other than the terminal regions, because the adsorbability to acid pigments is enhanced.

The above polyamine (C) is, for example, the following polyamine (c2) having two primary and/or secondary amino groups in each terminal region, and further having a secondary and/or tertiary amino group in a region other than the terminal regions.

The polyamine (c2) may be, for example, methyliminobispropylamine [N,N-bis(3-aminopropyl)methylamine], lauryliminobispropylamine [N,N-bis(3-aminopropyl)laurylamine], iminobispropylamine [N,N-bis(3-aminopropyl)amine], N,N'-bisaminopropyl-1,3-propylenediamine, or N,N'-bisaminopropyl-1,4-butylenediamine. Because the reaction with diisocyanates can be easily controlled, methyliminobispropylamine or lauryliminobispropylamine which has two primary amino groups and a tertiary amino group is preferable. Because of good adsorbability to pigments, iminobispropylamine having two primary amino groups and a secondary amino group is preferable.

In the present invention, the polymer (c3) having two or more primary and/or secondary amino groups can be used as the polyamine (C).

The polymer (c3) having two or more primary and/or secondary amino groups may be preferably selected from a homopolymer (such as polyvinylamine or polyallylamine) of ethylenic unsaturated monomers having a primary amino group or ethylenic unsaturated monomers having a secondary amino group, such as vinylamine or allylamine, or a copolymer of the above monomers and other ethylenic unsaturated monomers, a ring-opened polymer of ethyleneimine, a condensation polymer of ethylene chloride and ethylenediamine, or a ring-opened polymer of oxazolidone-2, i.e., polyethyleneimine. The content of the primary and/or secondary amino groups in the polymer is preferably 10 to 100% by weight, and more preferably 20 to 100% by weight as a monomer unit with respect to the polymer. When the content is 10% by weight or more, the aggregation of pigments and the increase of viscosity are effectively inhibited.

The ethylenic unsaturated monomer which can be copolymerized with the ethylenic unsaturated monomer having a primary amino group or the ethylenic unsaturated monomer having a secondary amino group may be, for example, (meth) acrylic acid, crotonic acid, itaconic acid, maleic acid, fumaric acid, or other unsaturated carboxylic acids;

styrene, α-methylstyrene, p-hydroxystyrene, chloromethylstyrene, indene, vinyl toluene, or other aromatic vinyl compounds;

methyl(meth)acrylate, ethyl(meth)acrylate, n-butyl(meth) acrylate, i-butyl (meth)acrylate, 2-ethylhexyl(meth)acrylate, or other alkyl(meth)acrylate esters; benzyl(meth)acrylate, or other alkylaryl(meth)acrylate esters;

glycidyl(meth)acrylate, 2-hydroxyethyl(meth)acrylate, or other substituted-alkyl(meth)acrylate having a functional group;

dimethylaminoethyl(meth)acrylate, dimethylaminopropyl (meth)acrylate, or other substituted-alkyl(meth)acrylate having a tertiary amino group;

(meth)acrylamide, dimethyl(meth)acrylamide, N-isopropyl (meth)acrylamide, n-butyl (meth)acrylamide, tert-butyl (meth)acrylamide, tert-octyl(meth)acrylamide, or other alkyl (meth)acrylamides;

dimethylaminoethyl(meth)acrylamide, dimethylaminopropyl(meth)acrylamide, or other substituted-alkyl(meth)acrylamide;

1,3-butadiene, isoprene, or other diene compounds;

polymethyl methacrylate oligomer having a methacryloyl group at one terminal end, polystyrene oligomer having a methacryloyl group at one terminal end, or polyethylene glycol having a methacryloyl group at one terminal end or other polymerizable oligomer (macromonomer); or vinyl cyanide.

The weight-average molecular weight (Mw) of the polymer having a primary and/or secondary amino group as a converted value of the corresponding polystyrene by means of GPC (gel permeation chromatography) is preferably 300 to 75,000, more preferably 300 to 20,000 and particularly preferably, 500 to 5,000. If the weight-average molecular weight is 300 to 75,000, an increase of viscosity of the pigment-dispersed product is effectively inhibited by inhibiting the aggregation of pigments.

<Monoamine (D)>

A monoamine (D) may be used in addition to the polyamine (C) as the amine compounds forming the dispersing agent of the present invention. The monoamine (D) is a compound having a primary amino group or a secondary amino group in the molecule, and is used as a reaction-terminating agent to inhibit an excessive polymerization by the reaction of the diisocyanate (B) and the polyamine (C). The monoamine (D) may contain a polar functional group in the molecule, in addition to a primary amino group or a secondary amino group. The polar functional group may be a hydroxy group, a carboxyl group, a sulfonic group, a phosphate group, cyano group, a nitroxylic group, or the like.

The monoamine (D) may be a known compound conventionally used in a synthesis of polyurethane or the like as a reaction-terminating agent, for example, aminomethane, aminoethane, 1-aminopropane, 2-aminopropane, 1-aminobutane, 2-aminobutane, 1-aminopentane, 2-aminopentane, 3-aminopentane, isoamylamine, N-ethylisoamylamine, 1-aminohexane, 1-aminoheptane, 2-aminoheptane, 2-octylamine, 1-aminononane, 1-aminodecane, 1-aminododecane, 1-aminotridecane, 1-aminohexadecane, stearylamine, aminocyclopropane, aminocyclobutane, aminocyclopentane, aminocyclohexane, aminocyclododecane, 1-amino-2-ethylhexane, 1-amino-2-methylpropane, 2-amino-2-methylpropane, 3-amino-1-propene, 3-aminomethylheptane, 3-isopropoxypropylamine, 3-butoxypropylamine, 3-isobutoxypropylamine, 2-ethylhexyloxypropylamine, 3-decyloxypropylamine, 3-lauryloxypropylamine, 3-myristyloxypropylamine, 2-aminomethyltetrahydrofuran, dimethylamine, diethylamine, N-methylethylamine, N-methylisopropylamine, N-methylhexylamine, diisopropylamine, di-n-propylamine, di-n-butylamine, di-sec-butylamine, N-ethyl-1,2-dimethylpropylamine, piperidine, 2-pipecoline, 3-pipecoline, 4-pipecoline, 2,4-lupetidine, 2,6-lupetidine, 3,5-lupetidine, 3-piperidinemethanol, pipecolinic acid, isonipecotic acid, methyl isonipecotate, ethyl isonipecotate, 2-piperidinoethanol, 4-piperidinoethanol, 4-piperidine butyricacid hydrochloride, 4-piperidinol, pyrrolidine, 3-aminopyrrolidine, 3-pyrrolidinol, indoline, aniline, N-butylaniline, o-aminotoluene, m-aminotoluene, p-aminotoluene, o-benzylaniline, p-benzylaniline, 1-anilinonaphthalene, 1-aminoanthraquinone, 2-aminoanthraquinone, 1-aminoanthracene, 2-aminoanthracene, 5-aminoisoquinoline, o-aminodiphenyl, 4-aminodiphenylether, β-aminoethylbenzene, 2-aminobenzophenone, 4-aminobenzophenone, o-aminoacetophenone, m-aminoacetophenone, p-aminoacetophenone, benzylamine, N-methylbenzylamine, 3-benzylamino propionic acid ethyl ether, 4-benzylpiperidine, α-phenylethylamine, phenethylamine, p-methoxyphenethylamine, furfurylamine, p-aminoazobenzene, m-aminophenol, p-aminophenol, allylamine, 2-amino-2-methyl-propanol or diphenylamine.

Of the above monoamine compounds, an aliphatic amine having only a secondary amino group is preferable, because this enhances dispersibility of the dispersing agent.

The aliphatic monoamine compound having only a secondary amino group may be dimethylamine, diethylamine, N-methylethylamine, N-methylisopropylamine, N-methylhexylamine, diisopropylamine, di-n-propylamine, di-n-butylamine, di-sec-butylamine, N-ethyl-1,2-dimethylpropylamine, piperidine, 2-pipecoline, 3-pipecoline, 4-pipecoline, 2,4-lupetidine, 2,6-lupetidine, 3,5-lupetidine, 3-piperidinemethanol, 2-piperidinoethanol, 4-piperidinoethanol, 4-piperidinol, pyrrolidine, 3-aminopyrrolidine, or 3-pyrrolidinol.

Because a tertiary amino group does not have an active hydrogen which can react with the isocyanate group, a diamine having a primary or secondary amino group and a tertiary amino group may be used as a reaction-terminating agent as the monoamine (D), so as to introduce a tertiary amino group having a property to enhance an adsorbability of pigments, into the polymer terminal of the dispersing agent of the present invention.

The diamine having a primary or secondary amino group and a tertiary amino group may be a diamine having a primary amino group and a tertiary amino group, such as N,N-dimethylethylene diamine, N,N-diethylethylene diamine, N,N-dimethyl-1,3-propane diamine, or N,N,2,2-tetramethyl-1,3-propane diamine; or a diamine having a secondary amino group and a tertiary amino group, such as N,N,N'-trimethylethylene diamine.

The amine compounds used as a reaction-terminating agent may be used alone or in combination thereof. An active hydrogen in a urea bonding formed by reacting a primary amino group and an isocyanate group has a low reactivity, and thus, cannot react with a further isocyanate group to increase a molecular weight under the polymerization conditions of the dispersing agent of the present invention.

<Urethane Prepolymer (E)>

The urethane prepolymer (E) is obtained by reacting the hydroxyl groups in the vinyl polymer (A) having two hydroxyl groups in one terminal region with the isocyanate groups in the diisocyanate (B).

For example, a urethane prepolymer having two isocyanate groups at one terminal region is theoretically formed when the equation:

$$\alpha/\beta = \alpha/(\alpha+1)$$

is satisfied, wherein a is a number of moles of the vinyl polymer (A) and β is a number of moles of the diisocyanate (B). If α is a positive integer, the larger a is, the higher the molecular weight. An actual structure control will be discussed below.

<Synthetic Catalyst (F)>

When the urethane prepolymer (E) is prepared, a known catalyst (F) conventionally used as a synthetic catalyst for polyurethane or the like may be used, and is, for example, a tertiary amine compound, or an organic metal compound.

The tertiary amine compound is, for example, triethylamine, triethylenediamine, N,N-dimethylbenzylamine, N-methylmorpholine, or diazabicycloundecene (DBU).

The organic metal compound may be a tin compound or a non-tin compound.

The tin compound is, for example, dibutyl tin dichloride, dibutyl tin oxide, dibutyl tin dibromide, dibutyl tin dimaleate, dibutyl tin dilaurate (DBTDL), dibutyl tin diacetate, dibutyl tin sulfide, tributyl tin sulfide, tributyl tin oxide, tributyl tin acetate, triethyl tin ethoxide, tributyl tin ethoxide, dioctyl tin oxide, tributyl tin chloride, tributyl tin trichloroacetate, tin 2-ethylhexanoate, or the like.

The non-tin compound is, for example, dibutyl titanium dichloride, tetrabutyl titanate, butoxy titanium dichloride, or other titanium-based compounds; lead oleate; lead 2-ethylhexanoate, lead benzoate, lead naphthenate, or other lead-based compounds; iron 2-ethylhexanoate, iron acetylacetonato, or other iron-based compounds; cobalt benzoate, 2-cobalt ethylhexanoate, or other cobalt-based compounds; zinc naphthenate, zinc 2-ethylhexanoate, or other zinc-based compounds; or zirconium naphthenate, or the like.

Of the above catalysts, dibutyl tin dilaurate (DBTDL), or tin 2-ethylhexanoate is preferable, in view of the reactivity and safety.

The tertiary amine compound or the organic metal compound can be used alone or in combination thereof.

The organometallic compound catalyst used in preparation of the urethane prepolymer (E) can remarkably accelerate the subsequent reaction with the amine as described below.

<Solvent for Synthesis>

When the urethane prepolymer (E) is prepared in the present invention, a known solvent conventionally used as a solvent for synthesis of polyurethane or the like may be used. The solvent used serves to easily control the reaction.

The solvent used in the above purposes may be, but is not to limited to, ethyl acetate, n-butyl acetate, isobutyl acetate, toluene, xylene, acetone, hexane, methyl ethyl ketone, cyclohexanone, propylene glycol monoloweralkyl ether acetate, diethylene glycol monoloweralkyl ether acetate, or diethylene glycol diloweralkyl ether.

It is preferable to use particularly ethyl acetate, toluene, methyl ethyl ketone, diethylene glycol diloweralkyl ether or a mixture thereof, in view of the solubility of the urethane prepolymer (E), the boiling point of the solvents, and the solubility of the amines. Of those solvents, a diethyleneglycol lower alkyl ether is preferable in view of the dispersion stability, and diethyleneglycol diethyl ether is particularly preferable in view of its low odor.

When the solvent is used, the concentration of urethane prepolymer in the reaction system is preferably 30 to 95% by weight in view of a reaction control, and more preferably 40 to 90% by weight in view of a viscosity control, as a concentration of the converted solid content of the urethane prepolymer. If the concentration is less than 30% by weight, the reaction rate may become slow and some compounds may remain unreacted. If the concentration is more than 95% by weight, part of the reaction may rapidly proceed, and a control of a molecular weight may be difficult.

<Synthesis Conditions>

There are many possible methods of performing the urethanization reaction by reacting the hydroxyl groups of the vinyl polymer (A) having two hydroxyl groups in one terminal region and the isocyanate groups of the diisocyanates (B) to produce the urethane prepolymer (E). The methods are generally classified into two methods:

1) a method wherein all the components are charged and reacted; and 2) a method wherein the vinyl polymer (A) having two hydroxyl groups in one terminal region, and optionally a solvent, are charged into a reaction vessel, the diisocyanate (B) is dropped into the vessel, and, if necessary, a catalyst is added.

Method 2) is preferable because the reaction can be accurately controlled. The reaction temperature to obtain the urethane prepolymer (E) is preferably 120° C. or less, and more preferably 50 to 120° C. If the temperature is more than 120° C., it may be difficult to control the reaction rate, and thus to obtain the urethane prepolymer (E) having the desired molecular weight and structure. It is preferable to carry out the urethanization reaction in the presence of a catalyst at 50 to 110° C. for 1 to 20 hours.

The mixing ratio of the vinyl polymer (A) having two hydroxyl groups in one terminal region and the diisocyanate (B) is as follows. The urethane prepolymer (E) having two isocyanate groups in one terminal region can be theoretically produced, when the mole fraction of the diisocyanate (B) is $\alpha+1$ with respect to an integer a of the mole fraction of the vinyl polymer (A) having two hydroxyl groups in one terminal region. The minimum value of $\alpha$ is 1, and thus, $(\alpha+1)/\alpha$, i.e., the mixing mole fraction of the diisocyanate (B) to the vinyl polymer (A), is 2 or less. When the amount of diisocyanate is increased, excess isocyanate groups in the mixture of the urethane prepolymer (E) and an excess amount of diisocyanate (B) can be introduced into the molecule of the dispersing agent of the present invention by arranging that the primary and/or secondary amino groups in the polyamine (C) and the monoamine (D) are reacted with all the isocyanate groups. In many cases, when the usual urethane prepolymer is produced, an excess amount of polyisocyanate is charged so that no polyols remain unreacted, taking into account the chain extension by polyamines in the next step. In the dispersing agent of the present invention, however, the polymer-constituting units derived from the excess diisocyanate (B) or impurities derived from hydrolyzed products of the excess diisocyanate (B) may often affect the pigment-dispersibility or the stability with time.

Therefore, the mixing molar ratio of the diisocyanate (B) to the vinyl polymer (A) having two hydroxyl groups in one terminal region is preferably 1.01 to 3.00 in view of the productivity of the urethane prepolymer, more preferably 1.30 to 2.30 in view of the design (a balance of the pigment-adsorbing sites and the solvent-affinity sites) of the final product, i.e., the dispersing agent, and most preferably 1.50 to 2.00 in view of the dispersion stability of the pigment-dispersed product obtained from the final product, i.e., the dispersing agent. If the mixing molar ratio is too small, the final product, i.e., the dispersing agent, has a high molecular weight, and thus, the viscosity of the pigment-dispersed product obtained from the dispersing agent becomes too high, and also the viscosity of the coating composition or ink derived therefrom becomes too high from a practical standpoint. If the mixing molar ratio is more than 2.00, the diisocyanate (B) without the vinyl polymer sites derived from the vinyl polymer (A) and thus, the urethane sites therefrom are increased, and serious adverse effects may be caused to the properties of the final product, i.e., the dispersing agent.

<Methods for Preparing the Dispersing Agent, Synthesis Conditions, and so on>

The dispersing agent of the present invention can be prepared by a method comprising:

a first step wherein a vinyl polymer (A) having two hydroxyl groups in one terminal region is produced by radical polymerization of ethylenic unsaturated monomers (a2) in the presence of a compound (a1) having two hydroxyl groups and one thiol group in each molecule, a second step wherein a urethane prepolymer (E) having two isocyanate groups in one terminal region is produced by reacting hydroxyl groups in the vinyl polymer (A) having two hydroxyl groups in one terminal region with isocyanate groups in diisocyanates (B), and a third step wherein isocyanate groups in the urethane prepolymer (E) having two isocyanate groups in one terminal region are reacted with primary and/or secondary amino groups in an amine compound comprising at least a polyamine (C) and optionally a monoamine (D).

In the present invention, the ureanization reaction to obtain the urethane urea resin or the polyurethane urea having a primary, secondary or tertiary amino group in the terminal from the urethane prepolymer (E), the polyamine (C), and the monoamine (D) is generally classified into one of the following two methods:

1) a method wherein the urethane prepolymer (E) solution is charged into a reaction vessel, and the polyamine (C) and the monoamine (D) are dropped into the vessel.

2) a method wherein a solution comprising the polyamine (C), the monoamine (D), and optionally the solvent is charged into a reaction vessel and the urethane prepolymer (E) solution is dropped into the vessel.

Although the synthesis is carried out by the method providing a stable reaction, the method 2) is preferable because the reaction can be accurately controlled. The temperature of the ureanization reaction in the present invention is preferably 100° C. or less, and more preferably 70° C. or less, and if the reaction rate is too high to control the reaction even at 70° C., most preferably 50° C. or less. If the temperature is more than 100° C., it may be difficult to control the reaction, and to obtain the urethane urea resin having the pre-determined molecular weight and structure.

The mixing ratio of the urethane prepolymer (E), the polyamine (C), and optionally the monoamine (D) is not limited, but may be appropriately determined in accordance with the applications and the properties required.

The end point of the reaction can be determined by the measurement of the isocianate % by titration, or the disappearance of an isocianate peak in an IR measurement.

The weight-average molecular weight (Mw) of the dispersing agent of the present invention is preferably 1,000 to 100,000, more preferably 1,500 to 50,000 and particularly preferably 1,500 to 20,000. If the weight-average molecular weight is less than 1,000, the stability of the pigment composition or the inkjet ink may be lowered. If the weight-average molecular weight is more than 100,000, an interaction of the resins may be heightened, and the viscosity of the pigment composition or the inkjet ink may be increased. Further, the amine number of the resulting dispersing agent is preferably 1 to 100 mgKOH/g, more preferably 2 to 50 mgKOH/g and particularly preferably 3 to 30 mgKOH/g. If the amine number is less than 1 mgKOH/g, there may be insufficient functional groups for adsorbing the pigments to distribute the dispersion of the pigments. If the amine number is more than 100 mgKOH/g, the pigments may aggregate to each other, sufficient effects in the viscosity decrease may not be obtained, and defects may be caused in the coating appearance.

The amount of the dispersing agent used in the inkjet ink of the present invention is preferably 5% by weight or more, more preferably 20% by weight or more, and most preferably 30% by weight or more, with respect to the weight of the pigment, in view of the dispersibility of the pigments. If the amount is less than 5% by weight, the stability of the dispersed solution, and the coating durability of the ink may be lowered.

<Other Dispersing Agent>

The dispersing agent of the present invention can be used in combination with a known dispersing agent to improve the dispersibility of the pigment or the storage stability of the pigment composition and the pigment-dispersed product. The known dispersing agent may be, for example, a carboxylic acid ester including a hydroxyl group, a salt of a long-chain polyaminoamide with a high molecular weight acid ester, a high molecular weight polycarboxylic acid salt, a salt of a long-chain polyaminoamide with a polar acid ester, a high molecular weight unsaturated acid ester, a polymeric copolymer, a modified polyurethane, a modified polyacrylate, a polyetherester-based anionic surface active agent, a naphthalenesulfonic acid-formalin condensate salt, an aromatic sulphonic acid-formalin condensate sodium salt, a polyoxyethylene alkyl phosphoric acid ester, a polyoxyethylene nonylphenyl ether, or stearyl amine acetate.

Specific examples of the known dispersing agent are those manufactured by BYK Chemie, such as "Anti-Terra-U (a polyaminoamide phosphate)", "Anti-Terra-203/204 (a high molecular weight polycarboxylate)", "Disperbyk-101 (a salt of a long-chain polyaminoamide with a polar acid ester), 107 (a carboxylic acid ester including a hydroxyl group), 110, 111 (a copolymer including an acid radical), 130 (a polyamide), 161, 162, 163, 164, 165, 166, 170, 180, or 182 (a polymeric copolymer)", "Bykumen (a high molecular weight unsaturated acid ester)", "BYK-P104, or P105 (a high molecular weight unsaturated polycarboxylic acid)", "P104S, or 240S (a mixture of a high molecular weight unsaturated polycarboxylic acid and a polysiloxane)", or "Lactimon (a mixture of a polysiloxane and a partially amidized product of a long-chain amine and an unsaturated polycarboxylic acid)".

Further examples are those manufactured by Efka CHEMICALS, such as "Efka 44, 46, 47, 48, 49, 54, 63, 64, 65, 66, 71, 701, 764, or 766", "Efkapolymer 100 (a modified polyacrylate), 150 (an aliphatic modified polyacrylate), 400, 401, 402, 403, 450, 451, 452, 453 (a modified polyacrylate), or 745 (a copper phthalocyanine-based)"; those manufactured by KYOEISHA CHEMICAL Co., LTD., such as "FLOWLEN TG-710 (a urethane oligomer)", "FLOWNON SH-290, or SP-1000", "POLYFLOW No. 50E, or No. 300 (an acrylic copolymer)", or those manufactured by Kusumoto Chemicals, Ltd., such as "DISPARLON KS-860, 873 SN, 874 (a polymer dispersing agent), #2150 (an aliphatic poly carboxylic acid), or #7004 (polyetherester-type)".

Other examples are those manufactured by Kao Corporation, such as "DEMOL RN, N (a naphthalenesulfonic acid-formalin condensate sodium salt), MS, C, SN-B (an aromatic sulphonic acid-formalin condensate sodium salt), or EP", "HOMOGENOL L-18 (polycarboxylic acid-based polymer)", "EMULGEN 920, 930, 931, 935, 950, or 985 (a polyoxyethylene nonylphenyl ether)", "ACETAMIN 24 (a coconut amine acetate), or 86 (a stearyl amine acetate)"; those manufactured by Lubrizol Corporation, such as "Solsperse 5000 (a phthalocyanine ammonium salt-based), 13940 (a polyester amine-based), 17000 (a aliphatic amine-based), or 24000"; those manufactured by Nikko Chemicals Co., Ltd., such as "NIKKOL T106 (a polyoxyethylene sorbitan monooleate), MYS-IEX (a polyoxyethylene monooleate), or Hexagline 4-0 (hexaglyceryl tetraolate)"; or those manufactured by Ajinomoto Fine-Techno Co., Inc., such as "AJISPER PB821, or PB822 (a basic type dispersing agent)".

An amount of the known dispersing agent used in addition to the dispersing agent of the present invention is preferably 0 to 50% by weight and more preferably 0 to 40% by weight, with respect to the amount of the dispersing agent of the present invention, in view of the dispersibility of the pigment. If the amount is 50% by weight or more, the coating durability of the ink may be deteriorated.

The most important characteristic feature of the inkjet ink of the present invention resides in its containing of the dispersing agent according to the present invention. The dispersing agent of the present invention has the characteristic structure wherein the urethane bondings, the urea bondings, or more preferably, primary and/or secondary and/or tertiary amino groups are on the polyurethane urea backbone chain as the pigment-adsorbing sites, and the polyacryrate chains are on the side chains as the solvent-affinity sites. Therefore, the pigment-adsorbing sites and the solvent-affinity sites are well balanced, and thus, an excellent dispersion stability is exhibited in a solvent.

Further, the polyacryl chain serving as the solvent-affinity site also provides a high coating durability of the ink after it is dried and cured.

Furthermore, when a binder resin for enhancing properties of an ink coating is added, the properties of the ink coating can be improved without affecting elemental properties of an inkjet ink, because the polyacryl chains on the side chains of the dispersing agent of the present invention, which is contained in the inkjet ink of the present invention, are excellently compatible with the binder resin.

<Pigment Composition>

The pigment composition can be produced by mixing a colorant with the dispersing agent of the present invention and dispersing it therein.

Colorants which can be contained in the inkjet ink of the present invention include various colorants used in printing inks or coating compositions. Colorants which can be used in the present invention are not limited, but may be, for example, achromatic pigments such as carbon black, titanium oxide, or calcium carbonate, or chromatic organic pigments.

<Pigment>

Pigments which can be used in the present invention are not limited, but may be, for example, soluble azo pigments, insoluble azo pigments, phthalocyanine pigments, halogenated phthalocyanine pigments, quinacridone pigments, isoindolinone pigments, isoindoline pigments, perylene pigments, perinone pigments, dioxazine pigments, anthraquinone pigments, dianthraquinolyl pigments, anthrapyrimidine pigments, anthanthrone pigments, indanthrone pigments, flavanthrone pigments, pyranthrone pigments, or diketopyrrolopyrrole pigments.

Specific examples are indicated by the generic name of Color Index as follows:

Pigment Black 7, Blue pigment, such as Pigment Blue 15, Pigment Blue 15:1, Pigment Blue 15:3, Pigment Blue 15:4, Pigment Blue 15:6, Pigment Blue 22, Pigment Blue 60, or Pigment Blue 64;

Green pigment, such as Pigment Green 7, Pigment Green 36, or Pigment Green 58; Rd pigment, such as Pigment Red 9, Pigment Red 48, Pigment Red 49, Pigment Red 52, Pigment Red 53, Pigment Red 57, Pigment Red 97, Pigment Red 122, Pigment Red 123, Pigment Red 144, Pigment Red 146, Pigment Red 149, Pigment Red 166, Pigment Red 168, Pigment Red 177, Pigment Red 178, Pigment Red 179, Pigment Red 180, Pigment Red 185, Pigment Red 192, Pigment Red 202, Pigment Red 206, Pigment Red 207, Pigment Red 209, Pigment Red 215, Pigment Red 216, Pigment Red 217, Pigment Red 220, Pigment Red 221, Pigment Red 223, Pigment Red 224, Pigment Red 226, Pigment Red 227, Pigment Red 228, Pigment Red 238, Pigment Red 240, Pigment Red 242, Pigment Red 254, or Pigment Red 255;

Violet pigment, such as Pigment Violet 19, Pigment Violet 23, Pigment Violet 29, Pigment Violet 30, Pigment Violet 37, Pigment Violet 40, or Pigment Violet 50; Yellow pigment, such as Pigment Yellow 12, Pigment Yellow 13, Pigment Yellow 14, Pigment Yellow 17, Pigment Yellow 20, Pigment Yellow 24, Pigment Yellow 74, Pigment Yellow 83, Pigment Yellow 86, Pigment Yellow 93, Pigment Yellow 94, Pigment Yellow 95, Pigment Yellow 109, Pigment Yellow 110, Pigment Yellow 117, Pigment Yellow 120, Pigment Yellow 125, Pigment Yellow 128, Pigment Yellow 137, Pigment Yellow 138, Pigment Yellow 139, Pigment Yellow 147, Pigment Yellow 148, Pigment Yellow 150, Pigment Yellow 151, Pigment Yellow 153, Pigment Yellow 154, Pigment Yellow 155, Pigment Yellow 166, Pigment Yellow 168, Pigment Yellow 180, Pigment Yellow 185, or Pigment Yellow 213;

Orange pigment, such as Pigment Orange 13, Pigment Orange 36, Pigment Orange 37, Pigment Orange 38, Pigment Orange 43, Pigment Orange 51, Pigment Orange 55, Pigment Orange 59, Pigment Orange 61, Pigment Orange 64, Pigment Orange 71, or Pigment Orange 74; or Brown pigment, such as Pigment Brown 23, Pigment Brown 25, or Pigment Brown 26.

Any carbon black such as a neutral, acidic, or basic carbon black can be used as the carbon black.

The concentration of the pigment used in the inkjet ink of the present invention is preferably 1 to 80% by weight and more preferably 2 to 50% by weight, on the basis of the solid content of the inkjet ink. If the concentration is less than 1% by weight, the coloring ability is lost. If the concentration is more than 80% by weight, the storage stability of the ink is deteriorated.

<Colorant Derivatives>

The colorant derivatives having an acidic substituent which can be used in the present invention will be explained hereinafter.

The colorant derivatives having an acidic substituent which can be used in the present invention may be at least one colorant derivative selected from the group consisting of the colorant derivatives of the following general formulas (1) to (3). The colorant derivatives are generally classified into two groups: colorant derivatives of the general formula (1) without an electric charge, and colorant derivatives of the general formulas (2) and (3) with an electric charge.

the general formula (1):

$$P—Z^1$$

In the general formula (1), P is a residue of an organic colorant selected from azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based organic colorants, and $Z^1$ is a sulfonic group or a carboxyl group.

the general formula (2):

$$(P—Z^2)[N^+(R^1,R^2,R^3,R^4)]$$

In the general formula (2), P is a residue of an organic colorant selected from azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based organic colorants, $R^1$ is an alkyl group having 5 to 20 carbon atoms, $R^2$, $R^3$, and $R^4$ are, independently, a hydrogen atom or an alkyl group having 1 to 20 carbon atoms, and $Z^2$ is $SO_3^-$ or $COO^-$.

the general formula (3):

$$(P—Z^2)M^+$$

In the general formula (3), P is a residue of an organic colorant selected from azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based organic colorants, M is Na or K atom, and $Z^2$ is $SO_3^-$ or $COO^-$.

In the colorant derivatives of the general formulas (1) to (3), P is a residue of an organic colorant. The chemical structure of the pigment used in an offset ink, a gravure ink, a resist ink for a color filter, an inkjet ink, a coating composition, and a colored resin composition is not necessarily identical to the chemical structure of the organic colorant residue as above. Taking into account the color tone of the ink finally produced or the like, it is preferable to use an achroma colorant derivative or a colorant derivative having a color tone similar to that of the pigment to be dispersed, in order to produce a pigment-dispersed product having an excellent color tone. For example, a yellow colorant derivative is used when a yellow pigment is dispersed, a red colorant derivative is used when a red pigment is dispersed, and a blue colorant derivative is used when a blue pigment is dispersed.

The amount of colorant derivative in the inkjet ink of the present invention is preferably 0 to 50% by weight and more preferably 0 to 30% by weight, with respect to the pigment. If the amount is more than 50% by weight, a coating durability of the ink is deteriorated.

The pigment composition of the present invention and, as mentioned below, the pigment-dispersed product, and the inkjet ink of the present invention may be produced by dissolving or suspending the dispersing agent in an organic solvent, adding thereto a pigment and if necessary, the colorant derivatives of the general formula (1) to (3), homogeneously mixing and stirring the whole in a high-speed mixer or the like, and then, dispersing in a dispersing device, for example, a bead mill or a roll mill, such as a horizontal sand mill, a vertical sand mill, or an annular sand mill, or a medium-free dispersing device. The colorant derivative may be used as an agent for treating a pigment surface by adding the colorant derivative when the pigment is produced, so that the pigment surface is treated in advance.

<Organic Solvent>

In the pigment composition of the present invention and, as mentioned below, the pigment-dispersed product, and the inkjet ink of the present invention, an organic solvent widely used in an offset ink, a gravure ink, a resist ink for a color filter, an inkjet ink, a coating composition, and a colored resin composition or the like may be used. To supplement this explanation, the organic solvent is not limited so long as the dispersing agent of the present invention can be dissolved or homogeneously suspended.

The organic solvent is, for example, methyl alcohol, ethyl alcohol, n-propyl alcohol, isopropyl alcohol, n-butyl alcohol, or other alcohols;

acetone, methyl ethyl ketone, methyl-n-propyl ketone, methyl isopropyl ketone, methyl-n-butyl ketone, methyl isobutyl ketone, methyl-n-amyl ketone, methyl isoamyl ketone, diethyl ketone, ethyl-n-propyl ketone, ethyl isopropyl ketone, ethyl-n-butyl ketone, ethyl isobutyl ketone, di-n-propyl ketone, diisobutyl ketone, cyclohexanone, methylcyclohexanone, isophorone, or other ketones;

methyl acetate, ethyl acetate, n-propyl acetate, isopropyl acetate, n-butyl acetate, isobutyl acetate, hexyl acetate, octyl acetate, methyl lactate, propyl lactate, butyl lactate, or other esters;

γ-butyrolactone, ε-caprolactone, or other lactones;

ethyleneglycol, diethyleneglycol, triethylene glycol, tetraethylene glycol, propylene glycol, or dipropylene glycol, or other glycols;

ethyleneglycol monoisopropyl ether, ethyleneglycol monobutyl ether, ethyleneglycol monohexyl ether, diethyleneglycol monomethyl ether, diethyleneglycol monoethyl ether, diethyleneglycol monobutyl ether, ethyleneglycol dimethyl ether, ethyleneglycol diethyl ether, diethyleneglycol dimethyl ether, diethyleneglycol methyl ethyl ether, diethyleneglycol diethyl ether, propyleneglycol monomethyl ether, propyleneglycol monoethyl ether, propyleneglycol monopropyl ether, propyleneglycol monobutyl ether, dipropyleneglycol monomethyl ether, dipropyleneglycol monoethyl ether, dipropyleneglycol dipropyl ether, tripropyleneglycol monomethyl ether, tetraethyleneglycol dimethyl ether, or other glycol ethers;

ethyleneglycol monomethylether acetate, ethyleneglycol monoethylether acetate, ethyleneglycol monobutylether acetate, diethyleneglycol monomethylether acetate, diethyleneglycol monoethylether acetate, diethyleneglycol monobutylether acetate, propyleneglycol monomethyl ether acetate, propyleneglycol monoethylether acetate, propyleneglycol monobutylether acetate, dipropyleneglycol monomethylether acetate, or other glycolacetates;

n-hexane, isohexane, n-nonane, isononane, dodecane, isododecane, or other saturated hydrocarbons;

1-hexene, 1-heptene, 1-octene, or other unsaturated hydrocarbons; cyclohexane, cycloheptane, cyclooctane, cyclodecane, decalin, or other cyclic saturated hydrocarbons;

cyclohexene, cycloheptene, cyclooctene, 1,1,3,5,7-cyclooctatetraene, cyclododecene, or other cyclic unsaturated hydrocarbons;

N-methyl-2-pyrrolidone, N-ethyl-2-pyrrolidone, 2-pyrrolidone, or other (N-alkyl)pyrrolidones;

N-methyl-2-oxazolidinone, or other N-alkyl oxazolidinones; or, benzene, toluene, xylene, or other aromatic hydrocarbons.

The organic solvents may be used alone or in combination. It is preferable to use the organic solvent identical to the solvent for the final use.

<Pigment-Dispersed Product>

The pigment-dispersed product prepared by dispersing the pigment composition of the present invention in a solvent or varnish may be used in various inks or coating compositions. In particular, the pigment-dispersed product dispersed in a varnish can be used as various printing inks or inkjet inks to impart fixability when applied.

<Solvent>

The above-mentioned organic solvents can be used as solvents for the pigment-dispersed product. The solvent for the pigment-dispersed product may be identical to those for preparing the dispersing agent, used in the pigment composition, or used in the inkjet ink as mentioned below. If necessary, a different solvent may be used.

<Varnish>

A resin which can be used as a varnish may be a thermoplastic resin, a thermosetting resin, or a photo-curable resin, and is used as a varnish after dissolving in an organic solvent. When the pigment-dispersed product is used for an inkjet ink as mentioned below, the resin for the varnish may be identical to the binder resin. If necessary, a different resin may be used.

The thermoplastic resin may be, for example, petroleum resin, casein, shellac, rosin-modified maleic resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride resin, polyvinylidene chloride, vinyl chloride vinyl acetate resin, ethylene vinyl acetate resin, acrylic resin, methacrylate resin, polyurethane resin, silicone resin, fluorocarbon resin, drying oil, synthetic drying oil, styrene maleic resin, styrene acrylic resin, polyamide resin, or butyral resin.

The thermosetting resin may be, for example, epoxy resin, phenol resin, benzoguanamine resin, melamine resin, or urea resin.

The photo-curable resin (photosensitive resin) may be, for example, a resin prepared by reacting a linear polymer having a reactive substituent such as a hydroxy group, a carboxyl group, or an amino group with: cinnamic acid; a (meth)acrylic compound having a reactive substituent such as an isocyanate group, an aldehyde group; or an epoxy group, to introduce a photo-crosslinkable group such as a (meth)acrylyl group, or styryl group into the linear polymer. Further, a product prepared by half-esterifying a linear polymer containing an anhydride, such as a styrene-maleic anhydride copolymer or an α-olefin-maleic anhydride copolymer, with a (meth)acrylic compound containing a hydroxy group, such as a hydroxyalkyl(meth)acrylate, may be used.

In the pigment-dispersed product and the inkjet ink of the present invention (described later), a plasticizer, a surface adjusting agent, a UV protective agent, a light stabilizer, an antioxidant, an antistatic agent, an antiblocking agent, an antifoaming agent, a viscosity adjusting agent, wax, a surface-active agent, a leveling agent, or other various additives may be used in accordance with their applications.

The pigment-dispersed product and the inkjet ink of the present invention may be used as a radiation curable ink which can be cured by ultraviolet light or an electron beam, by using a photo-polymerizable resin (photosensitive resin) varnish as the varnish, or by incorporating polymerizable monomers and/or oligomers.

The pigment-dispersed product and the inkjet ink of the present invention may be used as a thermosetting ink by using a thermosetting resin varnish as a varnish, or by incorporating a thermo-reactive compound (thermo-crosslinking agent).

The solvent contained in the varnish used in the present invention may be, for example, ethyl acetate, n-butyl acetate, isobutyl acetate, toluene, xylene, acetone, hexane, methyl ethyl ketone, cyclohexanone, propyleneglycol monomethyl ether acetate, diethyleneglycol monoethylether acetate, or diethyleneglycol diethyl ether, but is not limited thereto.

The pigment-dispersed product of the present invention is preferably used for an inkjet ink or a resist ink for a color filter. Therefore, it is preferable to use the solvent used in the inkjet ink or the ink for a color filter when preparing the dispersing agent, the pigment composition, the pigment-dispersed product, or the varnish. Such a solvent may be, for example, cyclohexanone, propyleneglycol monomethyl ether acetate, di-propyleneglycol monomethyl ether acetate, diethyleneglycol monoethyl acetate, diethyleneglycol monobutylether acetate, or diethyleneglycol diethyl ether. In view of reducing odor and achieving excellent solubility, it is most preferable to use diethyleneglycol diethyl ether.

<Inkjet Ink>

The pigment-dispersed product of the present invention may be used as an inkjet ink as it is. Print-durability can be improved by adding a binder resin as mentioned below.

<Binder Resin>

It is preferable to use a binder resin in the inkjet ink of the present invention. A resin prepared by a radical polymerization of the ethylenic unsaturated monomers (a3) is preferable as the binder resin, because it has an excellent compatibility with the dispersing agent used in the present invention, and a print-durability is enhanced a great deal.

When the ethylenic unsaturated monomers (a3) are polymerized to obtain the resin, 0.001 to 20 parts by weight of a polymerization initiator may be optionally used with respect to 100 parts by weight of the ethylenic unsaturated monomers (a3). If the amount is less than 0.001 part by weight, the molecular weight and viscosity may be increased and thus, the ease of discharging the ink may be lowered. If the amount is more than 20% by weight, the molecular weight of the vinyl polymer site may be too low for the durability. The polymerization initiator mentioned for the synthesis of the vinyl polymer (A) may be used for this purpose.

A known chain transfer agent conventionally used in preparing a vinyl polymer by a radical polymerization can be used at any amount as a chain transfer agent to control molecular weight and molecular weight distribution of the resulting binder resin. The chain transfer agent may be, for example,
mercaptoethanol, thioglycerol, thioglycolic acid, 2-mercaptopropionic acid, 3-mercaptopropionic acid, mercaptosuccinic acid, octyl thioglycolate, octyl 3-mercaptopropionate, 2-mercaptoethanesulfonic acid, n-dodecyl mercaptan, octyl mercaptan, or butylthioglycolate;
carbon tetrachloride, methylene chloride, bromoform, or bromotrichloroethane, or other halides;
isopropanol, or glycerin, or other secondary alcohols;
phosphorous acid, hypophosphorous acid, sulfurous acid, hydrogen sulfite, dithionous acid, metabisulfite, or other lower oxidized products; or
sodium hypophosphite, potassium hypophosphite, sodium hydrogen sulfite, potassium bisulfate, sodium dithionite, potassium dithionite, sodium metabisulfite, or potassium metabisulfite, or other salts of lower oxidized products.

Chain transfer agents may be used alone or in combination. When the solution polymerization is carried out, the polymerization solvent mentioned for the preparation of the vinyl polymer (A) may be used as the polymerization solvent in this purpose.

The ethylenic unsaturated monomer (a2) mentioned for the preparation of the vinyl polymer (A) may be used as the ethylenic unsaturated monomer (a3).

In the present invention, methyl methacrylate is preferably used and a combination of methyl methacrylate and butyl methacrylate is more preferably used, of the above-mentioned ethylenic unsaturated monomers (a3).

When methyl methacrylate is used as the ethylenic unsaturated monomer (a3), but butyl methacrylate is not used, the ratio of methyl methacrylate in the total amount of ethylenic unsaturated monomers (a3) is preferably 30 to 100% by weight, more preferably 50 to 100% by weight and most preferably 75 to 100% by weight.

When methyl methacrylate and butyl methacrylate are used as the ethylenic unsaturated monomer (a3), the total amount thereof in the overall amount of ethylenic unsaturated monomers (a3) is preferably 30 to 100% by weight, more preferably 50 to 100% by weight and most preferably 75 to 100% by weight.

When methyl methacrylate is used as the ethylenic unsaturated monomer (a3), or methyl methacrylate and butyl methacrylate are used as the ethylenic unsaturated monomers (a3), a good coating durability can be obtained.

When methyl methacrylate and butyl methacrylate are used as the ethylenic unsaturated monomers (a3), a mixing ratio by weight of methyl methacrylate and butyl methacrylate is preferably 1:0.01 to 9, more preferably 1:0.01 to 1 and most preferably 1:0.01 to 0.3. Methyl methacrylate acts to improve a coating durability, and butyl methacrylate acts to improve solubility to a solvent. The combination of methyl methacrylate and butyl methacrylate is used as the ethylenic unsaturated monomers (a3) to obtain the above advantageous effects in a balanced manner.

In a preferred embodiment of the present invention, a monomer of the following general formula (4) is used as the ethylenic unsaturated monomer (a3). The monomer of the general formula (4) is used in an amount of preferably 5 to 100% by weight and more preferably 5 to 70% by weight, with respect to a total amount of the ethylenic unsaturated monomer (a3). When the monomer of the general formula (4) is used, the affinity to a solvent and the solubility of the binder resin are improved.

the general formula (4):

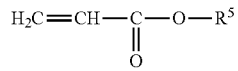

In the general formula (4), $R^5$ is a linear or branched alkyl group having 1 to 4 carbon atoms or a cycloaliphatic alkyl group having 6 to 15 carbon atoms.

The monomer of the general formula (4) may be, for example, methyl acrylate, ethyl acrylate, n-propyl acrylate, i-propyl acrylate, n-butyl acrylate, i-butyl acrylate, s-butyl acrylate, t-butyl acrylate, cyclohexyl acrylate, dicyclopentanyl acrylate, isobornyl acrylate, adamantly acrylate, methyl adamantly acrylate, or ethyl adamantly acrylate.

The weight-average molecular weight (Mw) of the binder resin as a converted value of the corresponding polystyrene by means of GPC is preferably 1,000 to 100,000, more preferably 3,000 to 50,000 and particularly preferably 5,000 to 40,000. When the weight-average molecular weight is from 5,000 to 40,000, both the coating durability and the ease of discharging the inkjet ink are excellent in a well balanced manner.

The glass transition temperature (Tg) of the binder resin is preferably 50 to 200° C. and more preferably 50 to 120° C., because with these values the coating durability is enhanced.

In the present invention, it is preferable to use at least one of methyl methacrylate and butyl methacrylate in the ethylenic unsaturated monomer (a3) used in the binder resin and the ethylenic unsaturated monomer (a2) used in the dispersing agent. In the above case, it is more preferable to use methyl methacrylate, but particularly preferable to use methyl methacrylate and butyl methacrylate in combination. When methyl methacrylate is used in both of the ethylenic unsaturated monomer (a2) and the ethylenic unsaturated monomer (a3), but butyl methacrylate is not used, a ratio of methyl methacrylate in the total amount of the ethylenic unsaturated monomer (a3) is preferably 30 to 100% by weight, more preferably 50 to 100% by weight and most preferably 75 to 100% by weight. When methyl methacrylate and butyl methacrylate are used in the ethylenic unsaturated monomer (a2) and ethylenic unsaturated monomer (a3), the total amount of them is preferably 30 to 100% by weight, more preferably 50 to 100% by weight and most preferably 75 to 100% by weight in the ethylenic unsaturated monomer (a3). When methyl methacrylate is used in both of the ethylenic unsaturated monomer (a2) and the ethylenic unsaturated monomer (a3), and when methyl methacrylate and butyl methacrylate are used, the compatibility of the binder resin and the dispersing agent is enhanced, and the coating durability, the coloring property and the glazing are improved.

In the present invention, when methyl methacrylate and butyl methacrylate are used in the ethylenic unsaturated monomer (a3) used for the binder resin and the ethylenic unsaturated monomer (a2) used for the dispersing agent, the mixing ratio by weight of methyl methacrylate and butyl methacrylate is preferably 1:0.01 to 9, more preferably 1:0.01 to 1 and most preferably 1:0.01 to 0.3. Methyl methacrylate acts to improve the coating durability, and butyl methacrylate acts to improve solubility to a solvent. The combination of methyl methacrylate and butyl methacrylate is used as the ethylenic unsaturated monomers (a3) used for the binder resin and the ethylenic unsaturated monomers (a2) used for the dispersing agent to obtain the above advantageous effects in a balanced manner.

As the binder resin, methyl methacrylate homopolymers and butyl methacrylate homopolymers can be mixed, instead of the copolymer containing methyl methacrylate and butyl methacrylate as the ethylenic unsaturated monomer. When a mixture of methyl methacrylate homopolymers and butyl methacrylate homopolymers is used, the mixing ratio by weigh of the methyl methacrylate homopolymer and the butyl methacrylate homopolymer is preferably 1:0.01 to 9, more preferably 1:0.01 to 1 and most preferably 1:0.01 to 0.3.

From the viewpoint of the durability of the ink coating, the amount of the binder resin used in the inkjet ink according to the present invention is preferably 2 to 30% by weight and more preferably 3 to 20% by weight in an inkjet ink. When an amount of the binder resin used is less than 2% by weight, the durability of the coating is lowered. When the amount of the binder resin used is more than 30% by weight, an inkjet ink may not be stably discharged from an inkjet head.

EXAMPLES

The present invention now will be further illustrated by, but is by no means limited to, the following Examples. The term "parts" denotes parts by weight, and the symbol "%" denotes % by weight. The number average molecular weight (Mn) and weight average molecular weight (Mw) is a molecular weight corresponding to that of polystyrene which is measured by a GPC (manufactured by TOSOH Corporation, HLC-8320GPC) equipped with an $R^1$ detector, using a TSK gel column (manufactured by TOSOH Corporation) and DMF as a developing solvent.

In the present specification, the term "pigment composition", the term "pigment-dispersed product", and the term "inkjet ink" are distinguished from each other: the "pigment composition" is prepared by mixing the dispersing agent according to the present invention and a colorant, and then dispersing the mixture in a solvent. The "pigment-dispersed product" is prepared by adding the dispersing agent as a varnish to the pigment composition to obtain an ink, and the "inkjet ink" is prepared by adding a binder resin as well as the dispersing agent to the pigment-dispersed product to improve in a fixability and a coating durability.

Preparation Example 1

Preparation of the Vinyl Polymer (A)

To a reaction vessel equipped with a gas supplying tube, a thermometer, a condenser, and a stirrer, 500 parts of methyl methacrylate, 11 parts of thioglycerol, and 511 parts of diethyleneglycol diethyl ether (DEDG) were charged. After the air in the reaction vessel was replaced by a nitrogen gas, the whole was heated to 90° C. and 0.50 part of AIBN [2,2'-azobis (isobutyronitrile)] was added. Then the reaction was carried out for 7 hours. After a solid content was measured to confirm that the reaction was performed to 95%, the whole was cooled to room temperature to obtain a solution (50% solid content) of a vinyl polymer (A-1) having two free hydroxyl groups in one terminal region and having a weight average molecular weight of 9,500.

Preparation Examples 2 to 12

Preparation of the Vinyl Polymers (A-2 to A-12)

The procedure described in Preparation Example 1 was repeated, except that the starting materials shown in Table 1 were used in the quantities shown in Table 1, to obtain solutions (50% solid content) of vinyl polymers (A-2 to A-12) having two free hydroxyl groups in one terminal region.

TABLE 1

|  |  |  | Preparation Example 1 | Preparation Example 2 | Preparation Example 3 | Preparation Example 4 | Preparation Example 5 | Preparation Example 6 |
|---|---|---|---|---|---|---|---|---|
| Vinyl polymer (A) |  |  | A-1 | A-2 | A-3 | A-4 | A-5 | A-6 |
| Polymerizing composition (part by weight) | Ethylenic unsaturated monomer (a2) | MMA | 500 | 500 |  | 400 | 400 | 400 |
|  |  | BMA |  |  | 500 |  |  |  |
|  |  | t-BMA |  |  |  | 100 | 100 |  |
|  |  | LMA |  |  |  |  |  | 100 |
|  |  | 2EHMA |  |  |  |  |  |  |
|  |  | CHMA |  |  |  |  |  |  |
|  |  | BA |  |  |  |  |  |  |
|  |  | EA |  |  |  |  |  |  |
|  |  | BzMA |  |  |  |  |  |  |
|  |  | St |  |  |  |  |  |  |

TABLE 1-continued

|  |  |  |  |  |  |  |  |
|---|---|---|---|---|---|---|---|
|  | Compound (a1) | Thioglycerol | 11 | 28 | 28 | 11 | 28 | 56 |
|  | Polymerization initiator | AIBN | 0.5 | 0.5 | 0.5 | 0.5 | 0.5 | 0.5 |
|  | Solvent for polymerization | DEDG PGMAc | 511 | 528 | 528 | 511 | 528 | 556 |
| Glass transition temperature (° C.) | | | 105 | 105 | 20 | 105 | 105 | 52 |
| Weight average molecular weight | | | 9,500 | 4,200 | 4,800 | 9,800 | 4,100 | 2,800 |

|  |  |  | Preparation Example 7 | Preparation Example 8 | Preparation Example 9 | Preparation Example 10 | Preparation Example 11 | Preparation Example 12 |
|---|---|---|---|---|---|---|---|---|
| Vinyl polymer (A) | | | A-7 | A-8 | A-9 | A-10 | A-11 | A-12 |
| Polymerizing composition (part by weight) | Ethylenic unsaturated monomer (a2) | MMA | 400 | 400 | 400 | 250 | 400 | 400 |
| | | BMA | | | | | | |
| | | t-BMA | | | | | | |
| | | LMA | | | | | | |
| | | 2EHMA | 100 | | | | | |
| | | CHMA | | 100 | | | | |
| | | BA | | | 100 | | | |
| | | EA | | | | 250 | | |
| | | BzMA | | | | | 100 | |
| | | St | | | | | | 100 |
| | Compound (a1) | Thioglycerol | 56 | 56 | 56 | 11 | 56 | 56 |
| | Polymerization initiator | AIBN | 0.5 | 0.5 | 0.5 | 0.5 | 0.5 | 0.5 |
| | Solvent for polymerization | DEDG | 556 | 556 | 556 | 511 | 556 | |
| | | PGMAc | | | | | | 556 |
| Glass transition temperature (° C.) | | | 74 | 96 | 61 | 30 | 93 | 104 |
| Weight average molecular weight | | | 3,200 | 2,900 | 3,000 | 10,500 | 3,100 | 2,800 |

Abbreviations in Table 1 have the meanings shown below.
MMA: methyl methacrylate
BMA: n-butyl methacrylate
t-BMA: t-butyl methacrylate
LMA: lauryl methacrylate
2EHMA: 2-ethylhexyl methacrylate
CHMA: cyclohexyl methacrylate
BA: n-butyl acrylate
EA: ethyl acrylate
BzMA: benzyl methacrylate
St: styrene
AIBN: 2,2'-azobis(isobutyronitrile)
DEDG: diethyleneglycol diethylether
PGMAc: propyleneglycol monomethylether acetate
Tg: glass transition temperature.

Manufacturing Example 1

Preparation of a Dispersing Agent (G-1)

To a reaction vessel equipped with a gas supplying tube, a thermometer, a condenser, and a stirrer, 1022 parts of the solution (50% solid content) of the vinyl polymer (A-1), 45.2 parts of isophorone diisocyanate, 45.1 parts of DEDG, and 0.11 g parts of dibutyl tin dilaurate as a catalyst were charged. The air in the reaction vessel was replaced by a nitrogen gas and the whole was heated to 100° C. After the reaction was carried out for 3 hours, the whole was cooled to 40° C. to obtain a colorless and transparent solution (B-1). Vessel equipped with a gas supplying tube, a thermometer, a condenser, and a stirrer was charged with: 11.1 parts of methyliminobispropylamine, 6.6 parts of dibutyl amine, and 304.6 parts of DEDG. After the whole was heated to 100° C., 1112.4 parts of the colorless and transparent solution (B-1) was added dropwise over 30 minutes. Then, the reaction was carried out for 1 hour, and the whole was cooled to room temperature. The reaction was completed. The solid content was adjusted to 40% to obtain a colorless and transparent solution of a dispersing agent (G-1). A weight average molecular weight of the dispersing agent (G-1) was 43,200, the amine number of the dispersing agent (G-1) was 9.0 mgKOH/g.

Manufacturing Examples 2 to 20

Preparation of Comparative Dispersing Agents 2 to 20

The procedure described in Manufacturing Example 1 was repeated, except that the starting materials shown in Table 2 were used in the amounts shown in Table 2, to obtain solutions of dispersing agents (G-2 to G-20).

TABLE 2

|  |  |  | Manufacturing Example 1 | Manufacturing Example 2 | Manufacturing Example 3 | Manufacturing Example 4 | Manufacturing Example 5 |
|---|---|---|---|---|---|---|---|
| Dispersing agent | | | G-1 | G-2 | G-3 | G-4 | G-5 |
| Composition in synthesis (part by weight) | Vinyl polymer (A) | | A-1 | A-1 | A-2 | A-3 | A-4 |
| | | | 1,022 | 1,022 | 1,056 | 1,056 | 1,022 |
| | Diisocyanate (B) | IPDI | 45.2 | 45.2 | 115.1 | 115.1 | 45.2 |
| | Catalyst | DBTDL | 0.11 | 0.11 | 0.12 | 0.12 | 0.11 |
| | Polyamine (C) | MIBPA | 11.1 | | 28.2 | | 11.1 |
| | | IBPA | | 10.0 | | 25.5 | |
| | | IPDA | | | | | |

TABLE 2-continued

|  |  |  | Manufacturing Example 1 | Manufacturing Example 2 | Manufacturing Example 3 | Manufacturing Example 4 | Manufacturing Example 5 |
|---|---|---|---|---|---|---|---|
|  | Monoamine (D) | DBA | 6.6 |  | 16.7 |  | 6.6 |
|  |  | BzA |  | 5.5 |  |  |  |
|  |  | AMP |  |  |  | 11.5 |  |
|  |  | PA |  |  |  |  |  |
|  | Solvent | DEDG | 349.7 | 346.4 | 503.9 | 492.0 | 349.7 |
|  |  | PGMAc |  |  |  |  |  |
| Weight average molecular weight |  |  | 43,200 | 44,500 | 18,500 | 21,600 | 38,900 |
| Amine number |  |  | 9.0 | 8.0 | 16.7 | 17.4 | 7.6 |

|  |  |  | Manufacturing Example 6 | Manufacturing Example 7 | Manufacturing Example 8 | Manufacturing Example 9 | Manufacturing Example 10 |
|---|---|---|---|---|---|---|---|
| Dispersing agent |  |  | G-6 | G-7 | G-8 | G-9 | G-10 |
| Composition | Vinyl polymer (A) |  | A-5 | A-6 | A-7 | A-8 | A-9 |
| in synthesis |  |  | 1,056 | 1,112 | 1,112 | 1,112 | 1,112 |
| (part by | Diisocyanate (B) | IPDI | 115.1 | 230.2 | 230.2 | 230.2 | 230.2 |
| weight) | Catalyst | DBTDL | 0.12 | 0.13 | 0.13 | 0.13 | 0.13 |
|  | Polyamine (C) | MIBPA | 28.2 | 60.2 | 60.2 | 56.4 | 56.4 |
|  |  | IBPA |  |  |  |  |  |
|  |  | IPDA |  |  |  |  |  |
|  | Monoamine (D) | DBA | 16.7 |  |  | 33.4 | 33.4 |
|  |  | BzA |  |  |  |  |  |
|  |  | AMP |  |  |  |  |  |
|  |  | PA |  | 12.2 | 12.2 |  |  |
|  | Solvent | DEDG | 503.9 | 731.7 | 731.7 | 757.9 | 757.9 |
|  |  | PGMAc |  |  |  |  |  |
| Weight average molecular weight |  |  | 19,000 | 16,500 | 17,000 | 13,300 | 11,900 |
| Amine number |  |  | 16.2 | 28.3 | 28.3 | 25.3 | 25.2 |

|  |  |  | Manufacturing Example 11 | Manufacturing Example 12 | Manufacturing Example 13 | Manufacturing Example 14 | Manufacturing Example 15 |
|---|---|---|---|---|---|---|---|
| Dispersing agent |  |  | G-11 | G-12 | G-13 | G-14 | G-15 |
| Composition | Vinyl polymer (A) |  | A-10 | A-11 | A-12 | A-1 | A-1 |
| in synthesis |  |  | 1,022 | 1,112 | 1,112 | 1,022 | 1,022 |
| (part by | Diisocyanate (B) | IPDI | 45.2 | 230.2 | 230.2 | 45.2 | 45.2 |
| weight) | Catalyst | DBTDL | 0.11 | 0.13 | 0.13 | 0.21 | 0.11 |
|  | Polyamine (C) | MIBPA | 11.1 | 56.4 | 56.4 |  | 14.8 |
|  |  | IBPA |  |  |  | 21.4 | 13.4 |
|  |  | IPDA |  |  |  |  |  |
|  | Monoamine (D) | DBA | 6.6 | 33.4 | 33.4 |  |  |
|  |  | BzA |  |  |  |  |  |
|  |  | AMP |  |  |  |  |  |
|  |  | PA |  |  |  |  |  |
|  | Solvent | DEDG | 349.7 | 757.9 |  | 836.4 | 365.4 |
|  |  | PGMAc |  |  | 757.9 |  |  |
| Weight average molecular weight |  |  | 42,500 | 13,900 | 13,600 | 19,700 | 21,900 |
| Amine number |  |  | 7.6 | 25.4 | 24.9 | 30.5 | 27.2 |

|  |  |  | Manufacturing Example 16 | Manufacturing Example 17 | Manufacturing Example 18 | Manufacturing Example 19 | Manufacturing Example 20 |
|---|---|---|---|---|---|---|---|
| Dispersing agent |  |  | G-16 | G-17 | G-18 | G-19 | G-20 |
| Composition | Vinyl polymer (A) |  | A-1 | A-1 | A-1 | A-2 | A-2 |
| in synthesis |  |  | 1,022 | 1,022 | 1,022 | 1,056 | 1,056 |
| (part by | Diisocyanate (B) | IPDI | 45.2 | 45.2 | 45.2 | 115.1 | 115.1 |
| weight) | Catalyst | DBTDL | 0.11 | 0.21 | 0.21 | 0.23 | 0.23 |
|  | Polyamine (C) | MIBPA |  |  |  |  |  |
|  |  | IBPA |  | 16.01 | 12.5 | 40.8 | 29.9 |
|  |  | IPDA | 34.6 |  |  |  |  |
|  | Monoamine (D) | DBA |  |  |  |  |  |
|  |  | BzA |  |  |  |  |  |
|  |  | AMP |  |  |  |  |  |
|  |  | PA |  |  |  |  |  |
|  | Solvent | DEDG | 375.2 | 823.98 | 815.68 | 1067.4 | 1042.1 |
|  |  | PGMAc |  |  |  |  |  |
| Weight average molecular weight |  |  | 22,600 | 23,900 | 26,000 | 13,600 | 31,600 |
| Amine number |  |  | 15.6 | 19.2 | 12.5 | 42.3 | 17.7 |

Abbreviations in Table 2 have the meanings shown below.

| IPDI: | isophorone diisocyanate |
| DBTDL: | dibutyl tin dilaurate |
| MIBPA: | methylimino bispropylamine |
|  | [also called N,N-bis(3-aminopropyl)methylamine] |
| IBPA: | imino bispropylamine |
|  | [also called N,N-bis(3-aminopropyl)amine] |
| IPDA: | isophorone diamine |
| DBA: | di n-butylamine |
| AMP: | 2-amino-2-methyl-propanol |
| PA: | 1-aminopropane |

| | |
|---|---|
| BzA: | benzylamine |
| DEDG: | diethyleneglycol diethyl ether |
| PGMAc: | propyleneglycol monomethyl ether acetate. |

Comparative Manufacturing Example 1

(Comparative) Manufacturing of a Dispersing Agent G-21

To a reaction vessel equipped with a thermometer, a stirrer, a nitrogen inlet, and a reflux tube, 10.0 parts of 12-hydroxystearic acid (manufactured by JUNSEI CHEMICAL CO., LTD.), and 190 parts of ε-caprolactone (manufactured by JUNSEI CHEMICAL CO., LTD.) were charged. The whole was heated to 160° C. over 4 hours under nitrogen gas stream. After the reaction was carried out for 2 hours at 160° C., the whole was heated until the amount of remaining ε-caprolactone was not more than 1%. Then, the whole was cooled to room temperature to obtain polyester having a number average molecular weight of 2604, and an acid number of 21.5 mgKOH/g. Then, 25.0 parts of xylene and 70 parts of a 10% polyallylamine aqueous solution ["PAA-1LV" manufactured by Nitto Boseki Co., LTD., and having a number average molecular weight of about 3,000] were mixed at 160° C. While water was distilled away by a separator and xylene was returned to the reaction solution, 13.9 parts of the polyester which had been pre-heated to 160° C. were added. The reaction was carried out at 160° C. for 2 hours. Then, xylene was replaced by DEDG, and the solid content was further adjusted to 40% to obtain a solution of a comparative dispersing agent (G-21) having a number average molecular weight of 10,500 and an amine number of 38.5 mgKOH/g.

Comparative Manufacturing Example 2

(Comparative) Manufacturing of a Dispersing agent G-22

While 238.8 parts of "Johncryl 682" (a low molecular weight alkali-soluble styrene acrylic copolymer manufactured by S.C. Johnson; Mn=980, Mw=1620, acid number=235 mgKOH/g, softening point=110° C., glass transition temperature=50° C.), 181.0 parts of "EMULGEN 105" [polyoxyethylene laurylether manufactured by Kao Corporation; HLB=9.7], 0.2 part of n-butyl octatitanate, and 72.5 g of xylene were heated under reflux in a nitrogen gas stream at 170 to 174° C. for 8 hours, 9.0 parts of water were separated with distillation in a Dean-Stark trap.

The reaction mixture was then cooled to 70° C., 365.5 parts of xylene and 21.6 parts of "EPOMIN SP-006" (polyethyleneimine manufactured by NIPPON SHOKUBAI CO., LTD.; Mw=600) were added, and the whole was heated under reflux at 136 to 138° C. for 1 hour, to separate 1.8 parts of water by distillation in a Dean-Stark trap.

The reaction product was cooled to room temperature to obtain a viscous resin solution having a clear pale yellow-brown color. The resin solution contained 49% of non-volatile matter, and had an acid number of 38.6 mgKOH/g, an amine number of 25.0 mgKOH/g, a viscosity of T to U by a Gardner method, and a color number of 8.

In the resin solution, xylene was replaced by DEDG. The solid content was adjusted to 40% to obtain a comparative dispersing agent (G-22).

Example 1

Preparation of a Pigment Composition 1

After 8.0 parts of copper-phthalocyanineblue as a blue pigment, 2.0 parts of a blue derivative, 2.0 parts (solid content) of the dispersing agent (G-1) prepared in Manufacturing Example 1, and 48 parts of DEDG (solvent) were mixed, 100 parts of zirconia beads (diameter=2 mm) were added. Pigment composition 1 was obtained after dispersion for 3 hours in a scandex.

Examples 2 to 20, and Comparative Examples 1 to 3

Preparation of Pigment Compositions 2 to 20, and Pigment Compositions C1 to C3

The procedure described in Example 1 was repeated, except that the ratios of components in the composition were changed to those shown in Table 3, to obtain pigment compositions 2 to 20, and pigment compositions C1 to C3.

TABLE 3

| | Dispersing agent (solution) | Part | Coloring material (organic pigment) | Part | Colorant derivative | Part | Solvent (part) DEDG | PGMAc | DMM | IPA | Pigment composition |
|---|---|---|---|---|---|---|---|---|---|---|---|
| Example 1 | G-1 | 2.0 | C.I. Pigment Blue 15:4 | 8.0 | Blue derivative | 2.0 | 48.0 | | | | 1 |
| Example 2 | G-2 | 2.0 | C.I. Pigment Blue 15:4 | 8.0 | Blue derivative | 2.0 | 3.0 | 45.0 | | | 2 |
| Example 3 | G-3 | 2.0 | C.I. Pigment Blue 15:4 | 8.0 | Blue derivative | 2.0 | 48.0 | | | | 3 |
| Example 4 | G-4 | 2.0 | C.I. Pigment Red 122 | 8.0 | Red derivative | 2.0 | 48.0 | | | | 4 |
| Example 5 | G-5 | 2.0 | C.I. Pigment Blue 15:4 | 8.0 | Blue derivative | 2.0 | 3.0 | | 45.0 | | 5 |
| Example 6 | G-6 | 2.0 | C.I. Pigment Green 36 | 8.0 | | | 48.0 | | | | 6 |
| Example 7 | G-7 | 2.0 | C.I. Pigment Blue 15:4 | 8.0 | Blue derivative | 2.0 | 48.0 | | | | 7 |
| Example 8 | G-8 | 2.0 | C.I. Pigment Yellow 150 | 8.0 | | | 48.0 | | | | 8 |
| Example 9 | G-9 | 2.0 | C.I. Pigment Red 122 | 8.0 | Red derivative | 2.0 | 48.0 | | | | 9 |
| Example 10 | G-10 | 2.0 | C.I. Pigment Green 36 | 8.0 | | | 3.0 | | 45.0 | | 10 |
| Example 11 | G-11 | 2.0 | C.I. Pigment Blue 15:4 | 8.0 | Blue derivative | 2.0 | 3.0 | | | 45.0 | 11 |
| Example 12 | G-12 | 2.0 | C.I. Pigment Blue 15:4 | 8.0 | Blue derivative | 2.0 | 45.0 | 3.0 | | | 12 |
| Example 13 | G-13 | 2.0 | C.I. Pigment Blue 15:4 | 8.0 | Blue derivative | 2.0 | 3.0 | 45.0 | | | 13 |
| Example 14 | G-14 | 2.0 | C.I. Pigment Blue 15:4 | 8.0 | Blue derivative | 2.0 | 48.0 | | | | 14 |
| Example 15 | G-15 | 2.0 | C.I. Pigment Blue 15:4 | 8.0 | Blue derivative | 2.0 | 48.0 | | | | 15 |
| Example 16 | G-16 | 2.0 | C.I. Pigment Blue 15:4 | 8.0 | Blue derivative | 2.0 | 48.0 | | | | 16 |
| Example 17 | G-17 | 2.0 | C.I. Pigment Blue 15:4 | 8.0 | Blue derivative | 2.0 | 48.0 | | | | 17 |
| Example 18 | G-18 | 2.0 | C.I. Pigment Red 122 | 8.0 | Red derivative | 2.0 | 48.0 | | | | 18 |
| Example 19 | G-19 | 2.0 | C.I. Pigment Yellow 150 | 8.0 | | | 48.0 | | | | 19 |

TABLE 3-continued

| | Dispersing agent (solution) | Coloring material Part | Coloring material (organic pigment) | Colorant Part | Colorant derivative | Part | Solvent (part) DEDG | Solvent (part) PGMAc | Solvent (part) DMM | Solvent (part) IPA | Pigment composition |
|---|---|---|---|---|---|---|---|---|---|---|---|
| Example 20 | G-20 | 2.0 | C.I. Pigment Black 7 | 8.0 | | | 48.0 | | | | 20 |
| Comparative Example 1 | G-21 | 2.0 | C.I. Pigment Green 36 | 8.0 | | | 48.0 | | | | C1 |
| Comparative Example 2 | G-21 | 2.0 | C.I. Pigment Green 36 | 8.0 | | | 3.0 | | | 45.0 | C2 |
| Comparative Example 3 | G-22 | 2.0 | C.I. Pigment Red 122 | 8.0 | Red derivative | 2.0 | 3.0 | | 45.0 | | C3 |

Abbreviations of solvents and derivatives in Table 3 have the meanings shown below.
DEDG: diethyleneglycol diethylether
PGMAc: propyleneglycol monomethylether acetate
DMM: dipropyleneglycol dimethylether
IPA: isopropyl alcohol
Blue derivative: a blue colorant derivative of the following general formula (6):

P—[SO$_3$H.H$_2$N(CH$_2$)$_{11}$CH$_3$]

wherein P is a copper phthalocyanine residue.
Red derivative: a red colorant derivative of the following general formula (7):

Q-(SO$_3$H)

wherein Q is a quinacridone residue.

<Evaluation of Pigment Compositions>

The pigment compositions according to the present invention were evaluated as to the conditions of the dispersion states (i.e., initial viscosities and stabilities with time) of the pigment compositions dispersed in a solvent or solvents, and the conditions (hazes) of coated films of the pigment composition after evaporating the solvent or solvents.

(1) Initial Viscosity:
After a dispersed product was allowed to stand at room temperature for 1 day, a viscosity was measured by a B-type viscometer (25° C., rotation speed=100 rpm). A lower viscosity indicates a better dispersion state.

(2) Stability with Time:
After the dispersed product was allowed to stand at 40° C. for 1 week, a viscosity was measured by a B-type viscometer (25° C., rotation speed=100 rpm). When the difference from the initial viscosity was less than ±10%, the grade was evaluated as ○. When the difference from the initial viscosity was ±10 to 20%, the grade was evaluated as □. When the difference from the initial viscosity was more than ±20%, the grade was evaluated as x. A rate closer to 0 indicates a better stability.

(3) Haze:
The Haze was measured by a Haze meter (light transmission=20%). A lower haze indicates a better state.

The results are shown in Table 4.

TABLE 4

| | Pigment composition | Dispersing agent | Initial viscosity mPa·s (25° C.) | Stability with time | Haze |
|---|---|---|---|---|---|
| Example 1 | 1 | G-1 | 16.8 | ○ | 0.68 |
| Example 2 | 2 | G-2 | 11.1 | Δ | 0.98 |
| Example 3 | 3 | G-3 | 12.5 | ○ | 0.77 |
| Example 4 | 4 | G-4 | 9.8 | ○ | 0.70 |
| Example 5 | 5 | G-5 | 12.2 | ○ | 0.89 |
| Example 6 | 6 | G-6 | 7.8 | ○ | 0.68 |
| Example 7 | 7 | G-7 | 9.5 | ○ | 0.78 |
| Example 8 | 8 | G-8 | 9.6 | ○ | 0.74 |
| Example 9 | 9 | G-9 | 8.9 | ○ | 0.65 |
| Example 10 | 10 | G-10 | 8.7 | ○ | 0.95 |
| Example 11 | 11 | G-11 | 14.6 | ○ | 0.84 |
| Example 12 | 12 | G-12 | 13.3 | ○ | 0.90 |
| Example 13 | 13 | G-13 | 14.2 | ○ | 0.92 |
| Example 14 | 14 | G-14 | 10.0 | ○ | 0.89 |
| Example 15 | 15 | G-15 | 12.3 | ○ | 0.92 |
| Example 16 | 16 | G-16 | 11.8 | ○ | 0.91 |
| Example 17 | 17 | G-17 | 10.5 | ○ | 0.90 |
| Example 18 | 18 | G-18 | 11.2 | ○ | 0.88 |
| Example 19 | 19 | G-19 | 7.7 | ○ | 0.95 |
| Example 20 | 20 | G-20 | 8.0 | ○ | 0.86 |
| Comparative Example 1 | C1 | G-21 | 8.7 | ○ | 1.00 |
| Comparative Example 2 | C2 | G-21 | 13.8 | Δ | 7.14 |
| Comparative Example 3 | C3 | G-22 | 24.6 | X | 3.54 |

As shown in the results of the evaluation, the pigment compositions 1 to 20 of Examples 1 to 20 wherein the dispersing agents according to the present invention were used, exhibited a low initial viscosity, little increase of the viscosity with time, and a good stability. The value of haze was also low. In contrast, the pigment composition C3 of Comparative Example 3 had a poor stability with time, this means that there is a problem in dispersibility. The pigment compositions C1 and C2 of Comparative Examples 1 and 2 were dependent on solvents, and this means that there is a problem in dispersibility.

Example 21

Preparation of Pigment-Dispersed Product 1

To 19.5 parts of ethyleneglycol monobutylether acetate, 10.0 parts of quinacridone pigment (quinacridone pigment Hostaperm Red E5B 02 manufactured by Clariant K.K.), 0.5 part of the colorant derivative A, and 10.0 parts of a solution of the dispersing agent (G-1) were incorporated, and the whole was agitated by a high-speed mixer until uniformly mixed. The resulting milled base was dispersed for 1 hour in a horizontal sand mill and 2.5 parts of a solution of the dispersing agent (G-1) and 57.5 parts of an additional solvent were added. The whole was agitated by a high-speed mixer until uniformly mixed, to prepare a pigment-dispersed product 1.

Examples 22 to 44 and Comparative Examples 4 to 5

Preparation of Pigment-Dispersed Products 2 to 24, and Pigment-Dispersed Products C1 to C2

The procedure described in Example 21 was repeated, except that the components shown in Table 5 were used to obtain pigment-dispersed products 2 to 24, and pigment-dispersed products C1 to C2.

TABLE 5

|  | | Example 21 | Example 22 | Example 23 | Example 24 | Example 25 | Example 26 |
|---|---|---|---|---|---|---|---|
| Pigment-dispersed product | | 1 | 2 | 3 | 4 | 5 | 6 |
| Pigment | | PV19 | PB15:3 | PV19 | PB15:3 | PB15:3 | PB15:3 |
| Colorant derivative | | A | B | A | B | B | B |
| Dispersing agent | | G-1 | G-2 | G-3 | G-4 | G-5 | G-6 |
| Solvent | | BGAc | BGAc | DEDG | BGAc | DEDG | BGAc |
| Composition in dispersing (part by weight) | Colorant (organic pigment) | 10.00 | 10.00 | 10.00 | 10.00 | 10.00 | 10.00 |
| | Colorant derivative | 0.50 | 0.50 | 0.50 | 0.50 | 1.40 | 0.50 |
| | Dispersant solution | 10.00 | 8.75 | 11.25 | 10.00 | 8.75 | 8.75 |
| | Solvent | 19.50 | 20.75 | 18.25 | 19.50 | 19.85 | 20.75 |
| Additional dispersant solution (part by weight) | | 2.50 | 1.25 | 1.25 | 0.00 | 1.25 | 1.25 |
| Additional solvent (part by weight) | | 57.50 | 58.75 | 58.75 | 60.00 | 58.75 | 58.75 |

|  | | Example 27 | Example 28 | Example 29 | Example 30 | Example 31 | Example 32 |
|---|---|---|---|---|---|---|---|
| Pigment-dispersed product | | 7 | 8 | 9 | 10 | 11 | 12 |
| Pigment | | PB15:3 | PV19 | PV19 | PB15:3 | PV19 | PV19 |
| Colorant derivative | | B | A | A | B | A | A |
| Dispersing agent | | G-7 | G-8 | G-9 | G-10 | G-11 | G-12 |
| Solvent | | BGAc | BGAc | BGAc | BGAc | DEDG | BGAc |
| Composition in dispersing (part by weight) | Colorant (organic pigment) | 10.00 | 10.00 | 10.00 | 10.00 | 10.00 | 10.00 |
| | Colorant derivative | 0.50 | 0.50 | 0.50 | 0.50 | 1.40 | 0.50 |
| | Dispersant solution | 8.75 | 10.00 | 10.00 | 8.75 | 8.75 | 8.75 |
| | Solvent | 20.75 | 19.50 | 19.50 | 20.75 | 19.85 | 20.75 |
| Additional dispersant solution (part by weight) | | 1.25 | 2.50 | 2.50 | 1.25 | 3.75 | 3.75 |
| Additional solvent (part by weight) | | 58.75 | 57.50 | 57.50 | 58.75 | 56.25 | 56.25 |

|  | | Example 33 | Example 34 | Example 35 | Example 36 | Example 37 | Example 38 |
|---|---|---|---|---|---|---|---|
| Pigment-dispersed product | | 13 | 14 | 15 | 16 | 17 | 18 |
| Pigment | | PV19 | PB15:3 | PV19 | PB15:3 | PV19 | PV19 |
| Colorant derivative | | A | B | A | B | A | A |
| Dispersing agent | | G-13 | G-14 | G-18 | G-18 | G-18 | G-18 |
| Solvent | | BGAc | DEDG | DEDG | DEDG | DEDG | DEDG |
| Composition in dispersing (part by weight) | Colorant (organic pigment) | 10.00 | 10.00 | 10.00 | 10.00 | 10.00 | 10.00 |
| | Colorant derivative | 0.50 | 0.50 | 0.50 | 0.50 | 0.50 | 0.50 |
| | Dispersant solution | 10.00 | 8.33 | 20.00 | 13.33 | 28.33 | 10.00 |
| | Solvent | 19.50 | 21.17 | 9.50 | 16.17 | 1.17 | 19.50 |
| Additional dispersant solution (part by weight) | | 2.50 | 0.00 | 3.33 | 16.67 | 1.67 | 1.67 |
| Additional solvent (part by weight) | | 57.50 | 60.00 | 56.67 | 43.33 | 58.33 | 58.33 |

|  | | Example 39 | Example 40 | Example 41 | Example 42 | Example 43 | Example 44 |
|---|---|---|---|---|---|---|---|
| Pigment-dispersed product | | 19 | 20 | 21 | 22 | 23 | 24 |
| Pigment | | PV19 | PB15:3 | PB15:3 | PB15:3 | PB15:3 | PB15:3 |
| Colorant derivative | | A | B | B | B | B | B |
| Dispersing agent | | G-15 | G-16 | G-17 | G-18 | G-19 | G-20 |
| Solvent | | DEDG | DEDG | DEDG | DEDG | DEDG | DEDG |
| Composition in dispersing (part by weight) | Colorant (organic pigment) | 10.00 | 10.00 | 10.00 | 10.00 | 10.00 | 10.00 |
| | Colorant derivative | 0.50 | 0.50 | 0.50 | 0.50 | 0.50 | 0.50 |
| | Dispersant solution | 10.00 | 10.00 | 13.33 | 13.33 | 13.33 | 13.33 |
| | Solvent | 19.50 | 19.50 | 16.17 | 16.17 | 16.17 | 16.17 |
| Additional dispersant solution (part by weight) | | 2.50 | 2.50 | 3.33 | 3.33 | 3.33 | 3.33 |
| Additional solvent (part by weight) | | 57.50 | 57.50 | 56.67 | 56.67 | 56.67 | 56.67 |

|  | | Comparative Example 4 | Comparative Example 5 |
|---|---|---|---|
| Pigment-dispersed product | | C1 | C2 |
| Pigment | | PV19 | PB15:3 |
| Colorant derivative | | A | B |
| Dispersing agent | | (Comparative Dispersing agent) G-21 | (Comparative Dispersing agent) G-22 |
| Solvent | | BGAc | BGAc |
| Composition in dispersing | Colorant (organic pigment) | 10.00 | 10.00 |

TABLE 5-continued

| | | | |
|---|---|---|---|
| (part by weight) | Colorant derivative | 0.50 | 0.50 |
| | Dispersant solution | 15.00 | 15.00 |
| | Solvent | 14.50 | 14.50 |
| Additional dispersant solution (part by weight) | | 0.00 | 0.00 |
| Additional solvent (part by weight) | | 60.00 | 60.00 |

Abbreviations in Table 5 have the meanings shown below.

Pigments
  PV19: quinacridone pigment (quinacridone pigment "Hostaperm Red E5B02" manufactured by Clariant K.K.; C.I. Pigment Violet 19)
  PB15:3: phthalocyanine pigment (phthalocyanine pigment "Lionol Blue FG-7351" manufactured by TOYO INK MFG. Co., Ltd.; C.I. Pigment Blue 15:3)

Colorant Derivatives
  Colorant derivatives A, and B: the colorant derivatives having the structures shown in the general formulas (6) and (7).

Dispersing Agents
  Dispersing agents G-1 to 20: The dispersing agents prepared in Manufacturing Examples 1 to 20, based on the disclosures in Table 2.
  Dispersing agents G-21 to 22: The comparative dispersing agents prepared in Comparative Manufacturing Examples 1 and 2.

Solvents
  BGAc: ethyleneglycol monobutylether acetate
  DEDG: diethyleneglycol diethyl ether Additional Solvents
  solvents same as the solvents used The pigment-dispersed products 1 to 24 and the pigment-dispersed products C1 to C2 were evaluated regarding (1) the dispersed particle diameter, as an index of dispersal properties, (2) viscosity, as an index of flowability, (3) change in viscosity with time, as an index of a storage stability, (4) a tolerance (I) to alcohol, as an index of a resistance of a coated film. The results are shown in the following Table 6.

(1) Dispersed Particle Diameter:
  The pigment-dispersed product was diluted to a 200 to 1000-fold volume with ethyl acetate, and then the dispersed particle diameter was measured using a Particle Size Analyzer, Microtrac UPA150 manufactured by Nikkiso Co., Ltd.

(2) Viscosity:
  The temperature of the pigment-dispersed product was adjusted to 25° C., and then the viscosity was measured using a Meodel E viscometer RE80 manufactured by Toki Sangyo Co., Ltd.

(3) Change in Viscosity with Time:
  After the pigment-dispersed product was allowed to stand at 70° C. for 1 week, the viscosity was measured in accordance with the methods described above. When the difference from the initial viscosity was not more than 5%, the grade was evaluated as □. When the difference from the initial viscosity was 5 to 10%, the grade was evaluated as ○. When the difference from the initial viscosity was 10 to 30%, the grade was evaluated as □. When the difference from the initial viscosity was not less than 30%, the grade was evaluated as x.

(4) Tolerance (I) to Alcohol:
  The pigment-dispersed product was printed in a solid image on a polyvinyl chloride sheet "METAMARK MD5" by a large-sized inkjet printer "Colorpainter 64S" manufactured by Seiko I Infotech Inc. The resulting sample was wiped with a cotton-tipped swab soaked with a diluted ethanol solution (ethanol/water=80/20), 10 times in a reciprocating motion. When no ink was transferred to the swab, the grade was evaluated as □. When the ink was slightly transferred to the swab, the grade was evaluated as ○. When some ink was transferred to the swab but the substrate of the printed side was not exposed, the grade was evaluated as □. When sufficient ink was transferred that the substrate was exposed, the grade was evaluated as x.

The results of the evaluations (1) to (4) are shown in Table 6.

TABLE 6

| | Example 21 | Example 22 | Example 23 | Example 24 | Example 25 | Example 26 |
|---|---|---|---|---|---|---|
| Pigment-dispersed product | 1 | 2 | 3 | 4 | 5 | 6 |
| Dispersed particle diameter | 200 | 150 | 200 | 150 | 150 | 160 |
| Viscosity | 10.1 | 11.2 | 9.8 | 10.5 | 10.8 | 8.9 |
| Viscosity with time | □ | □ | □ | □ | □ | □ |
| Alcohol tolerance (I) | □ | □ | □ | Δ | ○ | ○ |

| | Example 27 | Example 28 | Example 29 | Example 30 | Example 31 | Example 32 |
|---|---|---|---|---|---|---|
| Pigment-dispersed product | 7 | 8 | 9 | 10 | 11 | 12 |
| Dispersed particle diameter | 160 | 200 | 200 | 150 | 200 | 200 |
| Viscosity | 9.7 | 10.7 | 12.1 | 11 | 10.1 | 10.5 |
| Viscosity with time | □ | □ | □ | □ | □ | □ |
| Alcohol tolerance (I) | Δ | Δ | ○ | Δ | Δ | ○ |

TABLE 6-continued

|  | Example 33 | Example 34 | Example 35 | Example 36 | Example 37 | Example 38 |
|---|---|---|---|---|---|---|
| Pigment-dispersed product | 13 | 14 | 15 | 16 | 17 | 18 |
| Dispersed particle diameter | 210 | 150 | 200 | 150 | 220 | 200 |
| Viscosity | 10.3 | 9.4 | 13.7 | 14.9 | 15.7 | 11.0 |
| Viscosity with time | ○ | □ | □ | □ | ○ | □ |
| Alcohol tolerance (I) | ○ | ○ | □ | □ | □ | □ |

|  | Example 39 | Example 40 | Example 41 | Example 42 | Example 43 | Example 44 |
|---|---|---|---|---|---|---|
| Pigment-dispersed product | 19 | 20 | 21 | 22 | 23 | 24 |
| Dispersed particle diameter | 200 | 150 | 200 | 200 | 150 | 150 |
| Viscosity | 11.5 | 9.7 | 12.3 | 13.4 | 9.3 | 9.8 |
| Viscosity with time | □ | □ | □ | □ | □ | □ |
| Alcohol tolerance (I) | □ | □ | □ | □ | □ | □ |

|  | Comparative Example 4 | Comparative Example 5 |
|---|---|---|
| Pigment-dispersed product | C1 | C2 |
| Dispersed particle diameter | 240 | 350 |
| Viscosity | 9.5 | 16.8 |
| Viscosity with time | □ | X |
| Alcohol tolerance (I) | X | X |

As shown in Table 6, the pigment-dispersed products 1 to 24 of Example 21 to 44 wherein the dispersing agents according to the present invention were used, exhibited a low initial viscosity, little increase of the viscosity with time, and a good stability. It was confirmed that the pigment-dispersed products 1 to 24 can be used as an inkjet ink without further formulation, and had a good tolerance (I) to alcohol. In contrast, the pigment-dispersed product C2 of Comparative Example 5 had a poor stability with time, and this means that there is a problem in dispersibility. The pigment-dispersed product C1 of Comparative Example 4 had a poor tolerance (I) to alcohol. The pigment-dispersed products 1 to 24 wherein the dispersing agents according to the present invention were used can be used to not only in an inkjet ink, but also in an offset ink, a gravure ink, a resist ink for a color filter, a paint, various colored resin compositions or the like.

Then, methods for manufacturing the binder resin solution, which is used for preparing an inkjet ink having improved wiping durability and printability will be explained.

Manufacturing Example 23

Preparation of Binder Resin (H-1)

To a reaction vessel, 250 parts of ethyleneglycol monobutylether acetate were charged and heated to 80° C. while injecting a nitrogen gas into the vessel. Then, a mixture of 50.0 parts of methyl methacrylate, 50.0 parts of n-butyl methacrylate, and 4.0 parts of 2,2'-azobisisobutyronitrile was added dropwise over 1 hour at 80° C. to perform the polymerization reaction.

After the dropping was completed, the reaction was carried out for 3 hours at 80° C. Then, 1.0 part of 2,2'-azobisisobutyronitrile dissolved in 50 parts of ethyleneglycol monobutylether acetate was added, and the reaction was carried out for 1 hour at 80° C. to obtain an acrylic resin solution.

A solid content was adjusted to 20% by adding ethyleneglycol monobutylether acetate, and a solution of the binder resin (H-1) was obtained. The weight average molecular weight of the acrylic resin was about 20,000.

Manufacturing Examples 24 to 28

Manufacturing of Binder Resins (H-2) to (H-6)

The procedure described in Manufacturing Example 23 was repeated, except that the starting materials shown in Table 7 were used in amounts shown in Table 7, to obtain solutions of the binder resin (H-2) to (H-6).

TABLE 7

|  |  |  | Manufacturing Example 23 | Manufacturing Example 24 | Manufacturing Example 25 | Manufacturing Example 26 | Manufacturing Example 27 | Manufacturing Example 28 |
|---|---|---|---|---|---|---|---|---|
| Binder resin |  |  | H-1 | H-2 | H-3 | H-4 | H-5 | H-6 |
| Polymerizing composition | Ethylenic unsaturated | MMA | 50 | 80 | 35 | 50 | 40 | 100 |
|  |  | BMA | 50 | 20 | 65 | 20 | 20 |  |

TABLE 7-continued

|  |  |  | Manufacturing Example 23 | Manufacturing Example 24 | Manufacturing Example 25 | Manufacturing Example 26 | Manufacturing Example 27 | Manufacturing Example 28 |
|---|---|---|---|---|---|---|---|---|
| (part by weight) | monomer (a3) | BA |  |  |  | 30 | 20 |  |
|  |  | MA |  |  |  |  | 20 |  |
|  | Polymerization initiator | AIBN | 5 | 10 | 20 | 2.5 | 2 | 5 |
|  | Solvent for polymerization | BGAc | 300 |  | 300 |  |  |  |
|  |  | DEDG |  | 300 |  | 300 | 300 | 300 |
| Weight average molecular weight |  |  | 20,000 | 10,000 | 5,200 | 45,000 | 56,000 | 20,000 |

Abbreviations in Table 7 have the meanings shown below.
Ethylenic Unsaturated Monomers (a3)
  MMA: methyl methacrylate
  BMA: n-butyl methacrylate
  BA: n-butyl acrylate
  MA: methyl acrylate
Polymerization Initiators
  AIBN: 2,2'-azobis(isobutyronitrile)
Solvents for Polymerization
  BGAc: ethyleneglycol monobutylether acetate
  DEDG: diethyleneglycol diethyl ether Examples 45 to 54 and Comparative Examples 6 to 9

Preparation of inkjet inks 1 to 10, and C1 to C4

Inkjet inks were prepared from the components shown in Table 8 by mixing pigment-dispersed products shown in Table 6, binder resin solutions shown in Table 7, and solvents, to obtain inkjet inks 1 to 10, and inkjet inks C1 to C4.

Inkjet inks 1 to 10 of Examples 45 to 54, and inkjet inks C1 to C4 of Comparative Examples 6 to 9 were evaluated regarding (1) the dispersed particle diameter, as an index of dispersing properties, (2) the viscosity, as an index of flowability, (3) the change of viscosity with time, as an index of a storage stability, (4) the tolerance (II) to alcohol, as an index of a resistance of a coated film, (5) the wiping durability, (6) the discharging condition as an index of printability. When the compatibility between a dispersing agent and a binder resin is poor, all the evaluations (1) to (6) may show bad results.

(1) Dispersed Particle Diameter:
The inkjet ink was diluted to a 200 to 1000-fold volume with ethyl acetate, and then the dispersed particle diameter was measured using a Particle Size Analyzer, Microtrac UPA150 manufactured by Nikkiso Co., Ltd.

(2) Viscosity:
The temperature of the inkjet ink was adjusted to 25° C., and then the viscosity was measured using a Meodel E viscometer RE80 manufactured by Toki Sangyo Co., Ltd.

(3) Change of Viscosity with Time:
After the inkjet ink was allowed to stand at 70° C. for 1 week, the viscosity was measured in accordance with the

TABLE 8

|  | Example 45 | Example 46 | Example 47 | Example 48 | Example 49 | Example 50 | Example 51 |
|---|---|---|---|---|---|---|---|
| Inkjet ink | 1 | 2 | 3 | 4 | 5 | 6 | 7 |
| Amount of Pigment-dispersed product (Table 5) added (part by weight) | 1<br>20 | 2<br>20 | 3<br>20 | 11<br>20 | 11<br>20 | 18<br>20 | 18<br>20 |
| Amount of binder resin (Table 7) solution added (part by weight) | H-6<br>65 | H-2<br>65 | H-2<br>65 | H-4<br>70 | H-5<br>70 | H-6<br>65 | H-6<br>65 |
| An amount of the solvent (part by weight) | DEDG<br>15 | BGAc<br>15 | DEDG<br>15 | DEDG<br>10 | DEDG<br>10 | DEDG<br>15 | DEDG<br>15 |

|  | Example 52 | Example 53 | Example 54 | Comparative Example 6 | Comparative Example 7 | Comparative Example 8 | Comparative Example 9 |
|---|---|---|---|---|---|---|---|
| Inkjet ink | 8 | 9 | 10 | C1 | C2 | C3 | C4 |
| Amount of Pigment-dispersed product (Table 5) added (part by weight] | 19<br>20 | 20<br>20 | 3<br>20 | C1<br>20 | C1<br>20 | C1<br>20 | C1<br>20 |
| Amount of binder resin (Table 7) solution added (part by weight) | H-6<br>65 | H-6<br>65 | VYHD<br>5 | H-1<br>70 | H-2<br>65 | H-3<br>75 | H-4<br>65 |
| Amount of solvent (part by weight) | DEDG<br>15 | DEDG<br>15 | DEDG<br>75 | BGAc<br>10 | BGAc<br>15 | BGAc<br>5 | BGAc<br>15 |

Abbreviations in Table 8 have the meanings shown below.
Binder Resins (Table 7)
  H-1 to H-6: Binder resins prepared from the polymerizing compositions shown in Table
  VYHD: vinyl chloride-vinyl acetate resin (a vinyl chloride-vinyl acetate copolymer manufactured by Dow Chemical Company)

methods described above. When the difference from the initial viscosity was not more than 5%, the grade was evaluated as ☐. When the difference from the initial viscosity was 5 to 10%, the grade was evaluated as ○. When the difference from the initial viscosity was 10 to 30%, the grade was evaluated as ☐. When the difference from the initial viscosity was not less than 30%, the grade was evaluated as x.

(4) Tolerance (II) to Alcohol:
The inkjet ink was printed in a solid image on a polyvinyl chloride sheet "METAMARK MD5" by a large-sized inkjet printer "Colorpainter 64S" manufactured by Seiko I Infotech Inc. The resulting printed sample was wiped with a cotton-tipped swab soaked with ethanol, 10 times in a reciprocating motion. When no ink was transferred to the swab at all, the grade was evaluated as □. When the ink was slightly transferred to the swab, the grade was evaluated as ○. When some ink was transferred to the swab but the substrate of the printed side was not exposed, the grade was evaluated as □. When sufficient ink was transferred that the substrate was exposed, the grade was evaluated as x.

(5) Wiping Durability:

The printed sample obtained as in the above method was put into a Gakushin (Japan Society for the Promotion of Science) Tester, and wiped with a Kanakin No. 3 having a weight of 200 g, 25 times in a reciprocating motion. When no ink was transferred to the Kanakin No. 3 at all, the grade was evaluated as a When the ink was slightly transferred to the Kanakin No. 3, the grade was evaluated as □. When some ink was transferred to the Kanakin No. 3 but the substrate of the printed side was not exposed, the grade was evaluated as □. When sufficient ink was transferred that the substrate was exposed, the grade was evaluated as x.

(6) Discharging Condition (Printability):

The inkjet ink was printed in a solid image by a large-sized inkjet printer "Colorpainter 64S" manufactured by Seiko I Infotech Inc. for 10 minutes, and then, the printed result of a nozzle checking pattern was observed. When printing defects such as a nozzle lacking or a bending were not more than 1%, the grade was evaluated as O. When the printing defects were 1 to 10%, the grade was evaluated as Δ. When the printing defects were not less than 10%, the grade was evaluated as x.

The results of the evaluations (1) to (6) are shown in the following Table 9.

persing agents according to the present invention, the printing durability was further improved and the printability was enhanced while maintaining storage stability. Particularly, it was confirmed that when an acrylic resin is used as a binder resin, an excellent coating durability can be obtained. In contrast, the inkjet inks C1 to C4 of Comparative Examples 6 to 9 did not improve the tolerance (II) to alcohol, and had poor storage stability and printability, although the binder resins were added to the pigment-dispersed product without the dispersing agent according to the present invention.

Although the present invention has been described with reference to specific embodiments, various changes and modifications obvious to those skilled in the art are possible without departing from the scope of the appended claims.

The invention claimed is:

1. A dispersing agent wherein said dispersing agent is prepared by reacting primary and/or secondary amino groups of an amine compound comprising a polyamine (C) and isocyanate groups of a urethane prepolymer (E) having two isocyanate groups in one terminal region, wherein said urethane prepolymer (E) has been prepared by reacting hydroxyl groups in a vinyl polymer (A) having two hydroxyl groups in one terminal region with isocyanate groups in diisocyanates (B), and an amine number of said dispersing agent is 1 to 100 mgKOH/g.

2. The dispersing agent according to claim 1, wherein the amine compound comprises a monoamine (D) in addition to the polyamine (C).

3. The dispersing agent according to claim 1, wherein a weight-average molecular weight of the vinyl polymer (A) having two hydroxyl groups in one terminal region is 500 to 30,000.

TABLE 9

|  | Example 45 | Example 46 | Example 47 | Example 48 | Example 49 | Example 50 | Example 51 |
|---|---|---|---|---|---|---|---|
| Inkjet ink (Table 8) | 1 | 2 | 3 | 4 | 5 | 6 | 7 |
| Dispersed particle diameter | 190 | 150 | 200 | 200 | 200 | 200 | 150 |
| Initial viscosity | 9.8 | 11.3 | 8.6 | 8.9 | 9.8 | 9.7 | 9.3 |
| Viscosity with time | □ | □ | □ | □ | □ | □ | □ |
| Alcohol tolerance (II) | ○ | ○ | ○ | Δ | Δ | □ | □ |
| Wiping durability | □ | □ | ○ | Δ | Δ | □ | □ |
| Printability | □ | ○ | ○ | ○ | ○ | □ | □ |

|  | Example 52 | Example 53 | Example 54 | Comparative Example 6 | Comparative Example 7 | Comparative Example 8 | Comparative Example 9 |
|---|---|---|---|---|---|---|---|
| Inkjet ink (Table 8) | 8 | 9 | 10 | C1 | C2 | C3 | C4 |
| Dispersed particle diameter | 200 | 150 | 200 | 240 | 240 | 240 | 240 |
| Initial viscosity | 9.8 | 11.3 | 12 | 10.5 | 11.7 | 12.5 | 9.1 |
| Viscosity with time | □ | □ | Δ | X | X | X | X |
| Alcohol tolerance (II) | □ | □ | Δ | X | X | X | X |
| Wiping durability | □ | □ | Δ | Δ | □ | X | Δ |
| Printability | □ | □ | Δ | X | X | X | X |

The pigment-dispersed products 1 to 24 shown in Table 5 wherein the dispersing agents according to the present invention were used exhibited good results "o" as to the tolerance (I) to alcohol, as shown in Table 6. However, when the pigment-dispersed products 1 to 24 were evaluated as to the tolerance (II) to alcohol [harsher than the tolerance (I) to alcohol], the results were □ or x. This means that the pigment-dispersed products 1 to 24 were insufficient as an inkjet ink which requires a higher coating durability.

On the other hand, as shown in Table 9, in the inkjet inks 1 to 10 of Example 45 to 54 wherein the binder resins were added to the pigment-dispersed products containing the dis- 4. The dispersing agent according to claim 1, wherein the polyamine (C) is a compound having two primary and/or secondary amino groups.

5. The dispersing agent according to claim 1, wherein the polyamine (C) is a compound having two primary and/or secondary amino groups in both terminal regions, and further having a secondary and/or tertiary amino group in a region other than the terminal regions.

6. The dispersing agent according to claim 1, wherein its weight-average molecular weight is 1,000 to 100,000.

7. The dispersing agent according to claim 1, wherein the vinyl polymer (A) having two hydroxyl groups in one terminal region is prepared by radical polymerization of ethylenic unsaturated monomers (a2) in the presence of a compound (a1) having two hydroxyl groups and a thiol group in a molecule.

8. The dispersing agent according to claim 7, wherein the ethylenic unsaturated monomer (a2) comprises a lower alkyl (meth)acrylate.

9. The dispersing agent according to claim 8, wherein an amount of the lower alkyl(meth)acrylate is 30 to 100% by weight with respect to the total amount of the ethylenic unsaturated monomers (a2).

10. A method for preparing a dispersing agent, comprising:
a first step wherein a vinyl polymer (A) having two hydroxyl groups in one terminal region is produced by radical polymerization of ethylenic unsaturated monomers (a2) in the presence of a compound (a1) having two hydroxyl groups and one thiol group in a molecule,
   a second step wherein a urethane prepolymer (E) having two isocyanate groups in one terminal region is produced by reacting hydroxyl groups in the vinyl polymer (A) having two hydroxyl groups in one terminal region with isocyanate groups in diisocyanates (B), and
   a third step wherein isocyanate groups in the urethane prepolymer (E) having two isocyanate groups in one terminal region are reacted with primary and/or secondary amino groups in an amine compound comprising at least a polyamine (C).

11. The method for preparing the dispersing agent according to claim 10, wherein the amine compound comprises a monoamine (D) in addition to the polyamine (C).

12. The method for preparing the dispersing agent according to claim 10, wherein the first step, the second step, and/or the third step are carried out in a solvent, and said solvent is a diethylene glycol diloweralkyl ether.

13. A pigment composition comprising the dispersing agent according to claim 1, and a pigment.

14. The pigment composition according to claim 13, further comprising at least one pigment derivative selected from the group consisting of pigment derivatives having an acidic substituent of the following general formulas (1) to (3):
   the general formula (1):

P—$Z^1$ wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, and $Z^1$ is a sulfonic group, or a carboxyl group;
   the general formula (2):

(P—$Z^2$)[$N^+(R^1,R^2,R^3,R^4)$]

wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, $R^1$ is an alkyl group having 5 to 20 carbon atoms, $R^2$, $R^3$, and $R^4$ are, independently, a hydrogen atom or an alkyl group having 1 to 20 carbon atoms, and $Z^2$ is $SO_3^-$ or $COO^-$; and
   the general formula (3):

(P—$Z^2$)$M^+$ wherein P is a residue of at least one organic colorant selected from the group consisting of azo-based, benzimidazolone-based, phthalocyanine-based, quinacridone-based, anthraquinone-based, dioxazine-based, diketopyrrolopyrrole-based, quinophthalone-based, isoindolinone-based, isoindoline-based, perylene-based, perinone-based, flavanthrone-based, pyranthrone-based, and anthrapyrimidine-based colorants, M is an Na atom or a K atom, and $Z^2$ is $SO_3^-$ or $COO^-$.

15. A pigment-dispersed product prepared by dispersing the pigment composition according to claim 13 in a solvent or a varnish.

16. An inkjet ink comprising pigment-dispersed product according to claim 15 and a binder resin.

17. The inkjet ink according to claim 16, further comprising diethyleneglycol diethyl ether as a solvent.

18. The inkjet ink according to claim 16, wherein the binder resin is prepared by radical polymerization of ethylenic unsaturated monomers (a3).

19. The inkjet ink according to claim 18, wherein an amount of monomers of the following general formula (4) is 5 to 100% by weight with respect to 100% by weight of the total amount of the ethylenic unsaturated monomers (a3):
   the general formula (4):

$$H_2C=CH-\underset{\underset{O}{\|}}{C}-O-R^5$$

wherein $R^5$ is a linear or branched alkyl group having 1 to 4 carbon atoms, or a cycloaliphatic alkyl group having 6 to 15 carbon atoms.

20. The inkjet ink according to claim 18, wherein the ethylenic unsaturated monomers (a3) comprise methyl methacrylate.

21. The inkjet ink according to claim 20, wherein the ethylenic unsaturated monomers (a3) further comprise butyl methacrylate.

22. The inkjet ink according to claim 20, wherein a sum of the amounts of methyl methacrylate and butyl methacrylate is 30 to 100% by weight with respect to the total amount of the ethylenic unsaturated monomers (a3).

* * * * *